US009156928B2

(12) United States Patent
Nii et al.

(10) Patent No.: US 9,156,928 B2
(45) Date of Patent: Oct. 13, 2015

(54) ALKYL-MODIFIED VINYL ALCOHOL POLYMER, AND COMPOSITION, THICKENER, COATING MATERIAL FOR PAPER, COATED PAPER, ADHESIVE AND FILM CONTAINING THE SAME

(75) Inventors: Shinsuke Nii, Okayama (JP); Masato Nakamae, Okayama (JP); Yuta Taoka, Okayama (JP); Yasutomo Saito, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 329 days.

(21) Appl. No.: 13/703,140

(22) PCT Filed: Jun. 8, 2011

(86) PCT No.: PCT/JP2011/063182
§ 371 (c)(1),
(2), (4) Date: Feb. 20, 2013

(87) PCT Pub. No.: WO2011/155546
PCT Pub. Date: Dec. 15, 2011

(65) Prior Publication Data
US 2013/0209817 A1 Aug. 15, 2013

(30) Foreign Application Priority Data

Jun. 9, 2010 (JP) ................................. 2010-132070
Oct. 1, 2010 (JP) ................................. 2010-223798
Jan. 27, 2011 (JP) ................................. 2011-014832
Mar. 9, 2011 (JP) ................................. 2011-052249
Mar. 22, 2011 (JP) ................................. 2011-063339

(51) Int. Cl.
C08F 120/40 (2006.01)
C08F 218/08 (2006.01)
D21H 19/00 (2006.01)
D21H 19/60 (2006.01)
C09J 129/04 (2006.01)
C08F 8/12 (2006.01)

(52) U.S. Cl.
CPC ................. *C08F 120/40* (2013.01); *C08F 8/12* (2013.01); *C08F 218/08* (2013.01); *C09J 129/04* (2013.01); *D21H 19/00* (2013.01); *D21H 19/60* (2013.01); *Y10T 428/31895* (2015.04)

(58) Field of Classification Search
None
See application file for complete search history.

(56) References Cited

U.S. PATENT DOCUMENTS

| 4,144,388 | A | * | 3/1979 | Yatsu et al. ..................... 525/61 |
| 5,599,870 | A | | 2/1997 | Nakamae et al. |
| 2014/0018488 | A1 | * | 1/2014 | Kawagoe et al. ............. 524/430 |
| 2014/0243462 | A1 | * | 8/2014 | Taoka et al. ................... 524/166 |

FOREIGN PATENT DOCUMENTS

| CN | 101050342 A | 10/2007 |
| JP | 53 74588 | 7/1978 |
| JP | 55 47256 | 4/1980 |
| JP | 57 209901 | 12/1982 |
| JP | 58 15055 | 1/1983 |
| JP | 59 78963 | 5/1984 |
| JP | 62 195070 | 8/1987 |
| JP | 4 239085 | 8/1992 |
| JP | 7 188347 | 7/1995 |
| JP | 8 60137 | 3/1996 |
| JP | 8 81664 | 3/1996 |

(Continued)

OTHER PUBLICATIONS

International Search Report Issued Aug. 30, 2011 in PCT/JP11/63182 Filed Jun. 8, 2011.

(Continued)

*Primary Examiner* — Sheeba Ahmed
(74) *Attorney, Agent, or Firm* — Oblon, McClelland, Maier & Neustadt, L.L.P.

(57) ABSTRACT

An object of the invention is to provide a novel alkyl-modified PVA capable of exerting superior thickening properties while maintaining high water solubility, and also capable of having high water resistance in a state being hardened without using an especial crosslinking agent. In addition, another object is to provide a composition, a thickener, a coating material for papers, a coated paper, an adhesive and a film containing the alkyl-modified PVA. Provided is an alkyl-modified vinyl alcohol polymer containing (a) a monomer unit represented by the following general formula (I):

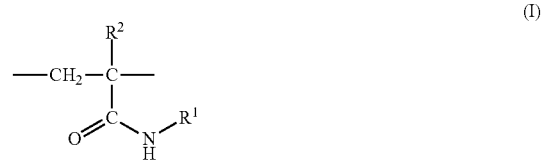

(I)

wherein, $R^1$ represents a linear or branched alkyl group having 8 to 29 carbon atoms; and $R^2$ represents a hydrogen atom or an alkyl group having 1 to 8 carbon atoms, and has a viscosity average degree of polymerization of no less than 200 and no greater than 5,000, a degree of saponification of no less than 20 mol % and no greater than 99.99 mol %, and a content of the monomer unit (a) of no less than 0.05 mol % and no greater than 5 mol %.

17 Claims, No Drawings

(56) References Cited

FOREIGN PATENT DOCUMENTS

| | | |
|---|---|---|
| JP | 8 217829 | 8/1996 |
| JP | 8 252975 | 10/1996 |
| JP | 8 281092 | 10/1996 |
| JP | 9 3388 | 1/1997 |
| JP | 9 3424 | 1/1997 |
| JP | 11 21530 | 1/1999 |
| JP | 2001 164219 | 6/2001 |
| JP | 2002 285019 | 10/2002 |
| JP | 2010 111969 | 5/2010 |

OTHER PUBLICATIONS

Extended European Search Report issued Dec. 1, 2014 in Patent Application No. 11792503.2.

* cited by examiner

ALKYL-MODIFIED VINYL ALCOHOL POLYMER, AND COMPOSITION, THICKENER, COATING MATERIAL FOR PAPER, COATED PAPER, ADHESIVE AND FILM CONTAINING THE SAME

CROSS-REFERENCE TO RELATED APPLICATIONS

This application is a National Stage of PCT/JP2011/063182 filed on Jun. 8, 2011. This application is based upon and claims the benefit of priority to the following Japanese Applications: Application No. 2010-132070 filed on Jun. 9, 2010; Application No. 2010-223798 filed on Oct. 1, 2010; Application No. 2011-014832 filed on Jan. 27, 2011; Application No. 2011-052249 filed on Mar. 9, 2011; and Application No. 2011-063339 filed on Mar. 22, 2011.

TECHNICAL FIELD

The present invention relates to a novel alkyl-modified vinyl alcohol polymer, and a composition, a thickener, a coating material for papers, a coated paper, an adhesive and a film containing the same.

BACKGROUND ART

Vinyl alcohol polymers (hereinafter, may be also referred to as "PVA(s)") have superior film forming properties, interface characteristics and strength characteristics as a few water soluble crystalline macromolecules. Therefore, PVAs have been playing an important role as basic materials of thickeners, coating materials for papers, adhesives, fiber processing agents, binders, emulsion stabilizers, films and fibers, and the like.

Furthermore, in order to improve certain performances of PVAs, a variety of modified PVAs have been developed by way of controlling crystallinity as well as introduction of a functional group, etc. Among the modified PVAs, alkyl-modified PVAs having an alkyl group introduced thereto are known to present an alkyl group (hydrophobic group) interaction in an aqueous solvent, thereby increasing thickening properties (see Japanese Unexamined Patent Application, Publication No. S55-47256). The alkyl-modified PVAs exhibit more superior thickening properties as the content of alkyl groups increases; however, a too high content of the alkyl groups leads to inferior water solubility. Therefore, in attempts to increase water solubility and the like, alkyl-modified PVAs having an ionic functional group introduced thereto were proposed (see Japanese Unexamined Patent Application, Publication Nos. S58-15055, S59-78963 and H8-60137). In addition, for the purpose of increasing performances as an emulsion stabilizer, a modified PVA similarly having an alkyl group and an ionic functional group (carboxyl group) was proposed (see Japanese Unexamined Patent Application, Publication No. H8-281092).

However, when an ionic functional group is introduced into an alkyl-modified PVA, a disadvantage may occur in the case in which the alkyl-modified PVA coexists with a substance having opposite ionicity, that binding with the substance results in deterioration of the thickening properties and storage stability. In addition, when used in, for example, films, adhesives, etc., the alkyl-modified PVA having an ionic functional group introduced thereto may have insufficient water resistance due to the presence of the ionic functional group, and when produced into films, for example, a disadvantage of deterioration of water repellency on the surface may also occur.

Furthermore, since PVAs are water soluble as described above, the case in which drying is carried out at particularly low temperatures is accompanied by a problem of insufficient water resistance of the coating film obtained. In order to solve this problem, a variety of improvements of PVAs or compositions thereof have been investigated. As a method for improving the water resistance, for example, a method in which a PVA is crosslinked with glyoxal, glutaraldehyde, a dialdehyde starch, a water soluble epoxy compound, a methylol compound or the like has been known. However, for making the coating film sufficiently water resistant by this method, it is necessary to carry out a heat treatment at temperatures as high as no less than 100° C., particularly no less than 120° C. for a long period of time.

In addition, according to a method in which a PVA-coating film is made water resistant by drying at low temperatures, a technique of preparing an aqueous PVA solution to give a strongly acidic condition such as for example, a pH of no greater than 2 has been known. However, in this case, a disadvantage of impaired viscosity stability of the aqueous PVA solution to result in gelation during use, and the like may occur, and also it would not be possible to attain sufficient water resistance of the coating film obtained.

Moreover, a method in which a carboxyl group-containing PVA is crosslinked with a polyamide epichlorohydrin resin; a method in which an acetoacetyl group-containing PVA is crosslinked with a polyvalent aldehyde compound such as glyoxal; a method in which crosslinking is permitted with a polyfunctional epoxy compound, a polyfunctional carboxy compound or a boron compound (see Japanese Unexamined Patent Application, Publication No. 2010-111969); and the like have been also investigated. However, when the crosslinking agent used in each of these methods is employed, a disadvantage of impaired viscosity stability of the aqueous PVA solution (coating material), etc., may occur.

On the other hand, adhesives containing a PVA as a principal component are inexpensive and have superior adhesiveness, and have been used for adhering paper boards, corrugated cardboards, paper tubes, sliding doors (i.e., fusuma), wall papers, wood building materials, and the like. In addition, adhesives containing a mixture of various types of emulsion and a PVA have been used as adhesives for woodworking, for fiber processing and for papers, and the like. Accordingly, the aqueous adhesives containing a PVA (i.e., PVA type aqueous adhesives) have been used for a broad range of intended usage. However, also with regard to PVA type aqueous adhesives, in order to meet an increase in coating process speed and the like in recent years, further improvement of adhesiveness that includes initial adhesiveness, as well as storage stability (viscosity stability and dispersion stability), and the like has been desired.

Under such circumstances, (1) an adhesive containing a PVA, a clay and a water soluble boron compound as principal components (see Japanese Unexamined Patent Application, Publication No. S62-195070), (2) a PVA type adhesive containing a certain metal salt (see Japanese Unexamined Patent Application, Publication No. H4-239085), (3) an adhesive containing a modified polyvinyl alcohol having an ethylene unit in an amount of 1 to 20 mol %, a starch and a saccharide (see Japanese Unexamined Patent Application, Publication No. H11-21530), and (4) an adhesive containing a vinyl alcohol polymer that includes 1.8 to 3.5 mol % 1,2-glycol bond in the molecule and has a degree of saponification of no less than 90 mol %, and an inorganic filler (see Japanese Unexamined Patent Application, Publication No. 2001-164219) were proposed.

The adhesive (1) can improve initial adhesiveness and has been industrially used broadly in manufacture of corrugated cardboards, and the like. However, use of a boron compound by which influences on the environment are concerned has been gradually restricted in recent years, and thus an alternative thereof has been strongly desired. In addition, a large number of attempts to improve initial adhesiveness similarly by using a candidate compound of a crosslinking agent of a PVA (for example, urea-formalin based resin, etc.) have been also made. However, there are some cases in which safety of the compound used as a crosslinking agent is substantially concerned, and also viscosity stability of the composition is not yet sufficient in many cases under current circumstances.

In addition, although the adhesive (2) has improved initial adhesiveness, its storage stability is problematic, and is thus not industrially satisfactory enough.

Furthermore, the adhesives (3) and (4) also have improved adhesiveness and storage stability to some extent; however, they do not sufficiently meet demands for an increase in coating process speed in recent years.

Additionally, these PVA type adhesives may be used as a mixture with various types of emulsion as described above for the purpose of improving adhesiveness and the like by increasing the concentration of the solid content, etc., improvement of the aforementioned performances (i.e., adhesiveness, storage stability, and the like) have been still desired for these adhesives.

PRIOR ART DOCUMENTS

Patent Documents

Patent Document 1: Japanese Unexamined Patent Application, Publication No. S55-47256
Patent Document 2: Japanese Unexamined Patent Application, Publication No. S58-15055
Patent Document 3: Japanese Unexamined Patent Application, Publication No. S59-78963
Patent Document 4: Japanese Unexamined Patent Application, Publication No. H8-60137
Patent Document 5: Japanese Unexamined Patent Application, Publication No. H8-281092
Patent Document 6: Japanese Unexamined Patent Application, Publication No. 2010-111969
Patent Document 7: Japanese Unexamined Patent Application, Publication No. S62-195070
Patent Document 8: Japanese Unexamined Patent Application, Publication No. H4-239085
Patent Document 9: Japanese Unexamined Patent Application, Publication No. H11-21530
Patent Document 10: Japanese Unexamined Patent Application, Publication No. 2001-164219

SUMMARY OF THE INVENTION

Problems to be Solved by the Invention

The present invention was made in view of the foregoing circumstances, and an object of the invention is to provide a novel alkyl-modified PVA capable of exerting superior thickening properties while maintaining high water solubility, and also capable of having high water resistance in a state being hardened without using an especial crosslinking agent. In addition, another object of the invention is to provide a composition, a thickener, a coating material for papers, a coated paper, an adhesive and a film containing the alkyl-modified PVA.

Means for Solving the Problems

An alkyl-modified PVA according to an aspect of the present invention made for solving the above problems contains
(a) a monomer unit represented by the following general formula (I):

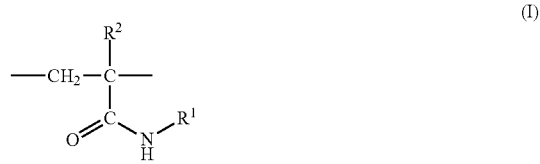

wherein, $R^1$ represents a linear or branched alkyl group having 8 to 29 carbon atoms; and $R^2$ represents a hydrogen atom or an alkyl group having 1 to 8 carbon atoms, and has a viscosity average degree of polymerization of no less than 200 and no greater than 5,000, a degree of saponification of no less than 20 mol % and no greater than 99.99 mol %, and a content of the monomer unit (a) of no less than 0.05 mol % and no greater than 5 mol %.

According to the alkyl-modified PVA, superior thickening properties can be exerted while maintaining high water solubility due to the presence of hydrophobic $R^1$ and a hydrophilic amide bond included in the monomer unit (a). In addition, the alkyl-modified PVA can have high water resistance in a state being hardened (hereinafter, the water resistance in a state being hardened may be merely referred to also as water resistance) due to having the monomer unit (a). Furthermore, when the viscosity average degree of polymerization, the degree of saponification and the content of the monomer unit (a) fall within the above range in the alkyl-modified PVA, the aforementioned characteristics can be improved. Therefore, the alkyl-modified PVA can be suitably used in, for example, thickeners, coating materials for papers, adhesives, films, and the like.

$R^1$ in the above formula (I) is preferably a linear or branched alkyl group having 15 to 26 carbon atoms. When such a long chain alkyl group is incorporated as $R^1$, the thickening properties, water resistance and the like can be further enhanced.

The degree of saponification of the alkyl-modified PVA is preferably no less than 60 mol % and no greater than 99.9 mol %. When the degree of saponification falls within such a range, an interaction between hydrophobic groups of the alkyl-modified PVA more effectively occurs, whereby, for example, the water resistance can be enhanced.

The alkyl-modified PVA is preferably obtained by saponification of a copolymer of an unsaturated monomer represented by the following general formula (II):

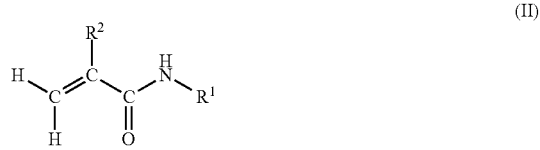

wherein, $R^1$ and $R^2$ are similarly defined to those in the above formula (I),
with a vinyl ester monomer.

In the alkyl-modified PVA, the content of a monomer unit (b) having a carboxyl group is preferably less than 0.1 mol %. Such a lowered content of the monomer unit (b) having a carboxyl group enables the water resistance and the like of the alkyl-modified PVA to be more effectively attained.

The composition according to one aspect of the present invention contains the alkyl-modified PVA. Since the composition contains the alkyl-modified PVA according to the aspect of the present invention, it can be suitably used as a thickener, a coating material for papers, an adhesive, a film, a paint, a binder, a fiber sizing agent, and the like.

It is preferred that the composition further contains water and an oil component, and the content of the alkyl-modified PVA with respect to 100 parts by mass of the oil component is no less than 0.1 parts by mass and no greater than 50 parts by mass. The composition has superior stickiness and is also excellent in storage stability.

The thickener according to one aspect of the present invention contains the alkyl-modified PVA. Since the thickener contains the alkyl-modified PVA, a superior thickening function can be exerted even if used in a small amount.

It is preferred that the thickener further contains water or a water-containing solvent. Such a thickener can be suitably used as a liquid form thickener.

The coating material for papers according to one aspect of the present invention contains the alkyl-modified PVA. Due to containing the alkyl-modified PVA, the coating material for papers enables strength and water resistance of a coating film obtained by coating on the surface of a paper to be enhanced without using an especial crosslinking agent. The reason for such a benefit, although uncertain, is believed to result from drying in a state in which, for example, alkyl groups ($R^1$) in the monomer unit (a) are associated with one another.

The coated paper according to one aspect of the present invention includes the coating material for papers provided by coating on the surface of a paper. Since the coated paper includes the coating material for papers provided by coating on the surface thereof, it has superior strength, water resistance and the like of the surface thereof.

The adhesive according to one aspect of the present invention contains the alkyl-modified PVA. Due to containing the alkyl-modified PVA, the adhesive achieves superior initial adhesiveness, storage stability and the like. The reason for such a benefit, although uncertain, is believed to concern an association of, for example, alkyl groups ($R^1$) in the monomer unit (a) with one another to serve as if it is a crosslinking agent, thereby resulting in improvement of the initial adhesiveness, and improvement of the storage stability owing to a balance of hydrophobicity and hydrophilicity originated from the structure of the monomer unit (a), and the like.

It is preferred that the adhesive further contains a polymer in the state of an emulsion, the polymer being obtained from at least one monomer selected from the group consisting of an ethylene unsaturated monomer and a diene monomer. When the adhesive is used as a mixture with an emulsion of such a polymer, drying characteristics and strength after adhesion can be further enhanced while attaining superior initial adhesiveness, storage stability and the like.

It is preferred that the adhesive further contains a filler. When the adhesive further contains a filler, drying characteristics, strength after adhesion and the like can be enhanced.

The adhesive can be suitably used for papers or for woodworking.

The film according to one aspect of the present invention contains the alkyl-modified PVA. Due to containing the alkyl-modified PVA, the film attains superior water repellency of the surface, and the like.

A contact angle of the film relative to water is preferably no less than 70°. Since the film has such a great contact angle, more superior water repellency of the surface can be attained.

Effects of the Invention

As explained in the foregoing, the alkyl-modified PVA according to an aspect of the present invention is capable of exerting superior thickening properties while maintaining high water solubility, and also capable of having high water resistance in a state being hardened without using an especial crosslinking agent. Therefore, the alkyl-modified PVA can be suitably used in, for example, thickeners, coating materials for papers, adhesives, film, and the like.

DESCRIPTION OF EMBODIMENTS

Hereinafter, embodiments of the alkyl-modified PVA, the composition, the thickener, the coating material for papers, the coated paper, the adhesive and the film will be explained in detail in sequence.

<Alkyl-Modified PVA>

The alkyl-modified PVA contains (a) a monomer unit represented by the following general formula (I). More specifically, the alkyl-modified PVA is a copolymer of the monomer unit (a) with a vinyl alcohol monomer unit (—$CH_2$—CHOH—), and may further have other monomer unit.

(I)

In the formula (I), $R^1$ represents a linear or branched alkyl group having 8 to 29 carbon atoms; and $R^2$ represents a hydrogen atom or an alkyl group having 1 to 8 carbon atoms. It is to be noted that the $R^1$ and $R^2$ may have a substituent such as a halogen atom in the range not to impair the effects of the present invention, but preferably $R^1$ and $R^2$ do not have such a substituent.

Although the number of carbon atoms included in the linear or branched alkyl group represented by $R^1$ is 8 or greater and 29 or less, the number is preferably 10 or greater and 28 or less, more preferably 12 or greater and 27 or less, still more preferably 15 or greater and 26 or less, and particularly preferably 17 or greater and 24 or less. When the number of carbon atoms is less than 8, interaction of the alkyl groups with one another in the alkyl-modified PVA does not occur; therefore, superior thickening properties, water resistance, adhesiveness, water repellency of the surface attained when formed into a film, and the like are not sufficiently achieved. To the contrary, when the number of carbon atoms is greater than 29, water solubility and the like of the alkyl-modified PVA are deteriorated.

Although the $R^2$ represents a hydrogen atom or an alkyl group having 1 to 8 carbon atoms, a hydrogen atom or a methyl group is preferred in light of ease in synthesis, and the like.

The content of the monomer unit (a) in the alkyl-modified PVA is no less than 0.05 mol % and no greater than 5 mol %. Furthermore, the content is more preferably no less than 0.1 mol %, and more preferably no less than 0.2 mol %. Moreover, the content is preferably no greater than 2 mol %, and more preferably no greater than 1 mol %. It is to be noted that the content of the monomer unit (a) as referred to herein means a content of the monomer unit (a) represented by the above formula (I) occupying the total structural units constituting the alkyl-modified PVA. Also, when the alkyl-modified PVA does not contain any other alkyl-modified monomer unit in addition to the monomer unit (a) represented by the above formula (I), the content of the monomer unit (a) corresponds to a percentage of alkyl modification (percentage of modification with alkyl), as generally referred to.

When the content of the monomer unit (a) is greater than 5 mol %, the proportion of the hydrophobic group contained per molecule of the alkyl-modified PVA increases, whereby the water solubility of the alkyl-modified PVA decreases. On the other hand, when the content of the monomer unit (a) is less than 0.05 mol %, superior water solubility of the alkyl-modified PVA is attained; however, due to the number of alkyl unit included in the alkyl-modified PVA being so small, physical properties derived from the alkyl modification such as thickening properties, water resistance, adhesiveness, storage stability, strength when formed into a coating film, and water repellency of the surface attained when formed into a film are not sufficiently attained.

The content of the monomer unit (a) can be determined from proton NMR of the alkyl-modified vinyl ester polymer that is a precursor of the alkyl-modified PVA. Specifically, reprecipitation purification of the alkyl-modified vinyl ester polymer with n-hexane/acetone sufficiently carried out at least three times is followed by drying under a reduced pressure at 50° C. for 2 days to produce a sample for the analysis. This sample is dissolved in $CDCl_3$, and the measurement is carried out with proton NMR (JEOL GX-500) at 500 MHz at room temperature.

In this process, for example, the content can be calculated according to the following method in the case in which: an alkyl-modified monomer unit other than the monomer unit (a) is not included; $R^1$ is linear; and $R^2$ represents a hydrogen atom. More specifically, the content of the monomer unit (a): S is calculated from a peak α (4.7 to 5.2 ppm) assigned to main chain methine of the alkyl-modified vinyl ester polymer, and a peak β (0.8 to 1.0 ppm) derived from the terminal methyl group of the alkyl group $R^1$, according to the following formula:

$S$(mol %)={(number of protons of peak β/3)/(number of protons of peak α+(number of protons of peak β/3))}×100

The content of the monomer unit (b) having a carboxyl group in the alkyl-modified PVA is preferably less than 0.1 mol %, and more preferably no greater than 0.01 mol %. When the content of the monomer unit (b) is no less than 0.1 mol %, the adhesiveness, the water resistance, the storage stability, the strength when formed into a coating film, and the like may be deteriorated, and the hydrophilicity may increase when formed into a film, whereby the contact angle may be decreased. It is to be noted that the content of the monomer unit (b) as referred to herein means a content of the monomer unit (b) occupying the total structural units constituting the alkyl-modified PVA, and may be determined from proton NMR similarly to the content of the monomer unit (a) described above.

The viscosity average degree of polymerization of the alkyl-modified PVA is no less than 200 and no greater than 5,000. It is to be noted that the viscosity average degree of polymerization may be merely referred to as "degree of polymerization". The degree of polymerization greater than 5,000 is not practical since the productivity of the alkyl-modified PVA is deteriorated. To the contrary, when the degree of polymerization is less than 200, each characteristic of the alkyl-modified PVA such as the thickening properties, the water resistance, the initial adhesiveness, and the strength when formed into a coating film or a film may not be sufficiently achieved. The lower limit of the degree of polymerization is preferably 500, and more preferably 1,000, in light of enhancement of the strength of the coating film and/or the film containing the alkyl-modified PVA.

The viscosity average degree of polymerization (P) is measured in accordance with JIS-K6726. More specifically, the viscosity average degree of polymerization (P) is determined according to the following formula from a limiting viscosity [η] (unit: dl/g) measured in water at 30° C. after the alkyl-modified PVA is resaponified and purified.

$$P=([\eta]\times10^3/8.29)^{(1/0.62)}$$

The degree of saponification of the alkyl-modified PVA is necessarily no less than 20 mol % and no greater than 99.99 mol %, and preferably no less than 40 mol % and no greater than 99.9 mol %. In particular, when water resistance is particularly required, the degree of saponification of the alkyl-modified PVA is more preferably no less than 60 mol % and no greater than 99.9 mol %, still more preferably no less than 70 mol % and no greater than 99.9 mol %, particularly preferably no less than 80 mol % and no greater than 99.9 mol %, and most preferably no less than 96 mol % and no greater than 99.9 mol %.

When the degree of saponification is less than 20 mol %, the water solubility and the like of the alkyl-modified PVA are deteriorated and association performances (i.e., crosslinking performances) brought by an interaction of hydrophobic groups are deteriorated, whereby the thickening properties, the water resistance, the adhesiveness, the strength when formed into a coating film and the water repellency of the surface attained when formed into a film are also deteriorated. To the contrary, the degree of saponification exceeding 99.99 mol % is not practical since production of the alkyl-modified PVA may be difficult. It is to be noted that the degree of saponification of the alkyl-modified PVA is a value obtained by measurement in accordance with JIS-K6726.

The alkyl-modified PVA enables superior thickening properties and the like to be exerted while maintaining the water solubility as described above, due to the presence of the hydrophobic $R^1$ and hydrophilic amide bond included in the monomer unit (a). In addition, due to having the monomer unit (a), the alkyl-modified PVA can have high water resistance in a state being hardened. Moreover, when the viscosity average degree of polymerization, the degree of saponification and the content of the monomer unit (a) fall within the above range in the alkyl-modified PVA, the characteristics described above can be improved. Therefore, the alkyl-modified PVA can be suitably used in for example, thickeners, coating materials for papers, adhesives, films, and the like.

<Method for Producing Alkyl-Modified PVA>

Although the method for producing the alkyl-modified PVA is not particularly limited, a method in which an unsaturated monomer represented by the following general formula (II) is copolymerized with a vinyl ester monomer, and the obtained alkyl-modified vinyl ester polymer is saponified is preferred. In this method, the copolymerization is suitably carried out in an alcohol solvent or in the absence of a solvent.

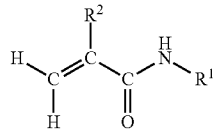

In the formula (II), $R^1$ and $R^2$ are similarly defined to those in the above formula (I).

Specific examples of the unsaturated monomer represented by the above formula (II) include N-octylacrylamide, N-decylacrylamide, N-dodecylacrylamide, N-octadecylacrylamide, N-hexacocylacrylamide, N-octylmethacrylamide, N-decylmethacrylamide, N-dodecylmethacrylamide, N-octadecylmethacrylamide, N-hexacocylmethacrylamide, and the like. Among these, the unsaturated monomer represented by the above formula (II) is preferably N-octadecylacrylamide, N-octylmethacrylamide, N-decylmethacrylamide, N-dodecylmethacrylamide, N-octadecylmethacrylamide and N-hexacocylmethacrylamide, more preferably N-octadecylacrylamide, N-dodecylmethacrylamide and N-octadecylmethacrylamide, and still more preferably N-octadecylacrylamide and N-octadecylmethacrylamide.

Examples of the vinyl ester monomer include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, and the like. Of these, vinyl acetate is preferred.

In copolymerizing the unsaturated monomer represented by the general formula (II) with the vinyl ester monomer, other monomer may be copolymerized within the range not to depart from the principles of the present invention. Examples of the monomer which may be used include:

α-olefins such as ethylene, propylene, n-butene and isobutylene;

vinyl ethers such as methyl vinyl ether, ethyl vinyl ether, n-propyl vinyl ether, i-propyl vinyl ether, n-butyl vinyl ether, i-butyl vinyl ether, t-butyl vinyl ether and 2,3-diacetoxy-1-vinyloxypropane;

nitriles such as acrylonitrile and methacrylonitrile;

halogenated vinyls such as vinyl chloride and vinyl fluoride;

halogenated vinylidenes such as vinylidene chloride and vinylidene fluoride;

allyl compounds such as allyl acetate, 2,3-diacetoxy-1-allyloxypropane and allyl chloride;

vinylsilyl compounds such as vinyltrimethoxysilane;

isopropenyl acetate; and the like.

Additionally, in copolymerization of the unsaturated monomer represented by the general formula (II) with the vinyl ester monomer, the copolymerization may be carried out in the presence of a chain transfer agent for the purpose of adjusting the degree of polymerization of the copolymer obtained, and the like, within the range not to depart from the principles of the present invention. Examples of the chain transfer agent include:

aldehydes such as acetaldehyde and propionealdehyde;

ketones such as acetone and methyl ethyl ketone;

mercaptans such as 2-hydroxyethanethiol;

halogenated hydrocarbons such as trichloroethylene and perchloroethylene;

phosphinic acid salts such as sodium phosphinate monohydrate;

and the like. Among these, aldehydes and ketones are suitably used.

The amount of the chain transfer agent added may be determined in accordance with the chain transfer constant of the chain transfer agent added, and the degree of polymerization of the intended alkyl-modified vinyl ester polymer, and is preferably 0.1 to 10% by mass with respect to the vinyl ester monomer, in general.

The temperature employed when the copolymerization of the unsaturated monomer represented by the general formula (II) with the vinyl ester monomer is carried out is preferably 0 to 200° C., and more preferably 30 to 140° C. When the temperature during carrying out the copolymerization is lower than 0° C., sufficient polymerization rate is not likely to be attained. In addition, when the temperature in carrying out the polymerization is higher than 200° C., an alkyl-modified PVA having the content of the monomer unit (a) specified according to the present invention is not likely to be obtained. As a method for adjusting the temperature employed in carrying out the copolymerization is adjusted to 0 to 200° C., for example, a method in which the polymerization rate is regulated to make a balance between heat generation resulting from the polymerization and heat radiation from the surface of the reaction vessel, a method of adjusting the temperature by an external jacket using an appropriate heating medium, and the like may be exemplified, and the latter method is preferred in light of safety.

Polymerization system employed in copolymerizing the unsaturated monomer represented by the general formula (II) with the vinyl ester monomer may involve any of batch polymerization, semi-batch polymerization, continuous polymerization and semi-continuous polymerization. As the polymerization method, a well-known arbitrary process such as a bulk polymerization process, a solution polymerization process, a suspension polymerization process or an emulsion polymerization process may be employed. Among these, a bulk polymerization process in which polymerization is carried out in the absence of a solvent or in an alcohol solvent, or a solution polymerization process is suitably employed. In the case in which production of a copolymer having a high degree of polymerization is intended, an emulsion polymerization process is employed.

Examples of the alcohol solvent which may be used include methanol, ethanol, n-propanol and the like, but not limited thereto. Also, these solvents may be used as a mixture of two or more types thereof.

As an initiator for use in the copolymerization, a conventionally well-known azo type initiator, peroxide type initiator, redox type initiator or the like may be appropriately selected in accordance with the polymerization method. Examples of the azo type initiator include 2,2'-azobisisobutyronitrile, 2,2'-azobis(2,4-dimethylvaleronitrile), 2,2'-azobis(4-methoxy-2, 4-dimethylvaleronitrile) and the like. Examples of the peroxide type initiator include percarbonate compounds such as diisopropyl peroxydicarbonate, di-(2-ethylhexyl) peroxydicarbonate and diethoxyethyl peroxydicarbonate; perester compounds such as t-butyl peroxyneodecanate, α-cumyl peroxyneodecanate and t-butyl peroxydecanate; acetyl cyclohexylsulfonyl peroxide; 2,4,4-trimethylpentyl-2-peroxyphenoxyacetate, and the like. Furthermore, the foregoing initiator may be combined with potassium persulfate, ammonium persulfate, hydrogen peroxide or the like to provide an initiator. In addition, as the redox type initiator, a combination of the aforementioned peroxide with a reducing agent such as sodium bisulfite, sodium bicarbonate, tartaric acid, L-ascorbic acid or Rongalite may be exemplified.

It is to be noted that when the copolymerization of the unsaturated monomer represented by the general formula (II) with the vinyl ester monomer is carried out at a high temperature, coloring, etc., of the alkyl-modified PVA resulting from degradation of the vinyl ester monomer may be found. In this case, addition of an antioxidant such as tartaric acid to the polymerization system for the purpose of preventing coloring in an amount of about 1 to 100 ppm with respect to the vinyl ester monomer is acceptable.

As a saponification reaction of the alkyl-modified vinyl ester polymer obtained by the copolymerization, a well-known alcoholysis reaction or hydrolysis reaction may be employed in which a basic catalyst such as sodium hydroxide, potassium hydroxide or sodium methoxide, or an acidic catalyst such as p-toluenesulfonic acid is used. The solvent which may be used in this reaction is exemplified by: alcohols such as methanol and ethanol; esters such as methyl acetate and ethyl acetate; ketones such as acetone and methyl ethyl ketone; aromatic hydrocarbons such as benzene and toluene, and the like. These may be used either alone, or in combination of two or more thereof. Among these, carrying out a saponification reaction using methanol or a mixture solution of methanol and methyl acetate as a solvent, and sodium hydroxide as a catalyst is preferred due to the convenience.

<Composition>

The composition according to one aspect of the present invention contains the alkyl-modified PVA. The composition may be in the form of a liquid containing the alkyl-modified PVA, a solvent and the like, or in the form of a solid provided by hardening of the liquid form composition by drying or the like. It is to be noted that a thickener, a coating material for papers, as well as a coating film, an adhesive and a film obtained therefrom which will be described later are also included in the composition. The case in which the composition is in the form of a liquid is explained below.

Although the solvent is not particularly limited, it is typically water, or may be other organic solvent such as an alcohol described later. Also, the solvent may be a mixed solvent of water with an organic solvent.

Although the concentration of the alkyl-modified PVA in the liquid form composition is not particularly limited, for example, when the solvent is water, the concentration may be no less than 1% by mass and no greater than 10% by mass. The composition can have a comparatively high concentration due to the high water solubility of the alkyl-modified PVA.

Since the liquid form composition contains the alkyl-modified PVA, when, for example, made into the form of a film, the coating film obtained by drying has high water resistance. The water resistance of the coating film can be evaluated by immersing the coating film in distilled water at 20° C. for 24 hours, and thereafter measuring the elution percentage of the coating film. The elution percentage is preferably less than 20% by mass, more preferably less than 10% by mass, and still more preferably less than 5% by mass.

The liquid form composition may contain a crosslinking agent, a plasticizer, a surfactant, a defoaming agent, an ultraviolet ray absorbing agent and the like of well-known various types within the range not to deteriorate the effects of the present invention.

The liquid form composition can be suitably used for each intended usage in which water resistance is desired, for example, as a coating material for papers (clear coating agent, pigment coating agent, internal sizing agent, binder for over coating on thermal papers, etc.), a binder, an adhesive, a fiber sizing agent, and the like.

The liquid form composition may contain water and an oil component in addition to the alkyl-modified PVA. The composition has superior stickiness and is also excellent in storage stability.

The oil component is typically present in the state of an emulsion which is dispersed in water. Such a dispersion liquid is exemplified by preexisting aqueous emulsion dispersion liquids such as an aqueous polyacrylate dispersion liquid, an aqueous dispersion liquid of a homopolymer or copolymer of an olefinic unsaturated monomer, an aqueous polyvinyl acetate dispersion liquid, an aqueous polyurethane dispersion liquid, and an aqueous polyester dispersion liquid.

The content of the alkyl-modified PVA in the composition with respect to 100 parts by mass of the oil component is preferably no less than 0.1 parts by mass and no greater than 50 parts by mass, and more preferably no less than 0.3 parts by mass and no greater than 5 parts by mass. When the content of the alkyl-modified PVA falls within the above range, the stickiness and the storage stability of the composition can be attained with a good balance.

It is to be noted that in order to improve the storage stability of the composition, comparatively increasing the degree of polymerization and the content of the monomer unit (a) of the PVA is preferred.

<Thickener>

Since the thickener according to one aspect of the present invention contains the alkyl-modified PVA, superior thickening properties can be exerted.

The thickener may be either a powder form thickener including the alkyl-modified PVA, or a liquid form thickener containing water or a water-containing solvent. The liquid form thickener is suitable when used relative to water dispersible emulsions such as paints, adhesive, and the like.

The solvent included in the water-containing solvent is not particularly limited, but examples of the solvent include: alcohol solvents such as methanol and ethanol; ester solvents such as methyl acetate and ethyl acetate; ether solvents such as diethyl ether, 1,4-dioxane, methylcellosolve, cellosolve, butylcellosolve, MTBE (methyl-t-butyl ether) and butylcarbitol; ketone solvents such as acetone and diethyl ketone; glycol solvents such as ethylene glycol, propylene glycol, diethylene glycol and triethylene glycol; glycol ether solvents such as diethylene glycol monomethyl ether, triethylene glycol monomethyl ether, propylene glycol monomethyl ether and 3-methoxy-3-methyl-1-butanol; glycol ester solvents such as ethylene glycol monomethyl ether acetate, PMA (propylene glycol monomethyl ether acetate), diethylene glycol monobutyl ether acetate and diethylene glycol monoethyl ether acetate, and the like.

When the thickener is in the form of a liquid, the amount of the alkyl-modified PVA blended with respect to 100 parts by mass of the solvent is preferably 1 to 50 parts by mass, and more preferably 3 to 30 parts by mass. Such a liquid form thickener is produced by adding the alkyl-modified PVA to water or a water-containing solvent, followed by heat mixing.

To the liquid form thickener, various types of plasticizer, surfactant, defoaming agent, ultraviolet ray absorbing agent and the like may be blended within the range not to deteriorate the effects of the present invention.

In addition, the thickener may be blended with well-known various types of PVA, other water soluble macromolecules such as a starch, carboxymethyl cellulose, methyl cellulose, hydroxymethyl cellulose, hydroxyethyl cellulose or hydroxypropylmethyl cellulose, similarly within the range not to deteriorate the effects of the present invention. The amount of these other water soluble macromolecules blended is preferably no greater than 50 parts by mass with respect to 100 parts by mass of the alkyl-modified PVA.

The thickener exhibit superior thickening properties in small amounts, and also exhibit stable thickening properties. Therefore, the thickener can be suitably used as a thickener for use in water-based solutions and water-based emulsion solutions such as paints, cements, concretes, binders, adhesives and cosmetics.

<Coating Material for Papers>

The coating material for papers according to one aspect of the present invention contains the alkyl-modified PVA. The coating material for papers is typically an aqueous solution of the alkyl-modified PVA, and other solvent and additives may be contained.

Although the concentration of the alkyl-modified PVA in the coating material for papers is not particularly limited, and in light of coating properties, and the strength, the water resistance and the like of the resulting coating film, the concentration of the alkyl-modified PVA is preferably no less than 0.5% by mass and no greater than 20% by mass, and more preferably no less than 1% by mass and no greater than 10% by mass in an aqueous alkyl-modified PVA solution.

The additive contained in the coating material for papers is exemplified by a filler, various types of macromolecules, a water proofing agent, a pH adjusting agent, a defoaming agent, a surfactant, and the like.

Examples of the filler include kaolins, clays, baked clays, calcium carbonate, titanium oxide, diatomaceous earth, aluminum oxide, aluminum hydroxide, synthetic aluminum silicate, synthetic magnesium silicate, polystyrene fine particles, polyvinyl acetate fine particles, urea-formalin resin fine particles, precipitative silica, gelatinous silica, silica synthesized by a gas phase process (hereinafter, may be referred to as gas phase process silica), colloidal silica, colloidal alumina, pseudo-boehmite, talc, zeolite, alumina, zinc oxide, satin white, organic pigment, and the like.

Examples of the macromolecule include unmodified PVAs, various types of modified PVAs such as sulfonic acid group-modified PVAs, acrylamide-modified PVAs, cationic group-modified PVAs and long chain alkyl group-modified PVAs, water soluble macromolecules such as starches, modified starches, casein and carboxymethyl cellulose, styrene-butadiene latexes, emulsions of a synthetic resin such as polyester acrylate emulsion, vinyl acetate-ethylene copolymer emulsion, vinyl acetate-acrylate ester copolymer emulsions, and the like.

The solid content concentration in the coating material for papers is not particularly limited, and may be appropriately adjusted to meet the intended usage and the like, but taking into consideration the coating properties and the like, the solid content concentration is preferably no less than 1% by mass and no greater than 65% by mass, more preferably no less than 1% by mass and no greater than 40% by mass, still more preferably no less than 1% by mass and no greater than 20% by mass, and particularly preferably no less than 2% by mass and no greater than 15% by mass.

The coating material for papers can be suitably used for intended usage in which water resistance is desired such as, for example, over coating layers of thermal papers. In this case, the content of the additive typified by fillers is preferably no less than 50 parts by mass and no greater than 150 parts by mass, and more preferably no less than 80 parts by mass and no greater than 120 parts by mass with respect to 100 parts by mass of the alkyl-modified PVA. Also, the solid content concentration of the coating material for papers (paint for over coating layers) may be appropriately adjusted to fall within the range of, for example, no less than 10% by mass and no greater than 65% by mass.

In addition, the coating material for papers is also suitably used as a filler binder such as an ink receiving layer binder of ink jet recording papers. In this case, the coating material for papers preferably contains the filler as an additive. In such a case, the ratio of the filler such as silica and the alkyl-modified PVA to be contained is not particularly limited, with respect to 100 parts by mass of the filler, the alkyl-modified PVA is contained in an amount of preferably no less than 3 parts by mass and no greater than 100 parts by mass, more preferably no less than 5 parts by mass and no greater than 40 parts by mass, and still more preferably no less than 10 parts by mass and no greater than 30 parts by mass.

Also, the coating material for papers can be further used as, for example, a barrier agent and the like. Also in this case, each of the aforementioned additives may be appropriately contained. The content of the additive typified by a filler, a defoaming agent and the like is not particularly limited, and the content is preferably no less than 1 part by mass and no greater than 20 parts by mass, and more preferably no less than 1 part by mass and no greater than 5 parts by mass with respect to 100 parts by mass of the alkyl-modified PVA. In addition, the solid content concentration of the coating material for papers may be appropriately adjusted within the range of, for example, no less than 1% by mass and no greater than 20% by mass.

The method of coating the coating material for papers on the surface of a paper is not particularly limited, and a well-known coater (i.e., size press coater, air knife coater, blade coater, roll coater, etc.) may be used. After the coating on the surface of a paper, an arbitrary step such as a drying step and/or a calendaring step may be employed as needed.

<Coated Paper>

The coated paper according to one aspect of the present invention is obtained by coating the coating material for papers on the surface of a paper. Since the coated paper includes the coating material for papers coated on the surface, it is superior in the strength and water resistance on the surface. The coated paper can be produced by a well-known method. The coated paper can be suitably used as, for example, a thermal paper, an ink jet recording paper, a base paper of a release paper, and the like.

<Adhesive>

The adhesive according to one aspect of the present invention contains the alkyl-modified PVA. The adhesive is typically an aqueous solution of the alkyl-modified PVA, and other additive, etc., may be included.

The concentration of the alkyl-modified PVA in the adhesive is not particularly limited, and in light of coating properties, adhesiveness, the strength, water resistance etc., of the adhesion portion, the concentration in an aqueous alkyl-modified PVA solution is preferably no less than 0.5% by mass and no greater than 20% by mass, and more preferably no less than 1% by mass and no greater than 10% by mass.

It is believed that the alkyl-modified PVA contained in the adhesive forms pseudo-aggregates in water by way of interactions between hydrophobic groups of specified alkyl groups ($R^1$). The formation is believed to result in achievement of high viscosity and a thickening behavior as the concentration increases, which are important characteristics for attaining initial adhesive strength, and also the formation allows storage stability such as dispersion stability and a settling stability of the filler to be improved. Furthermore, formation of pseudo-aggregates from the specified alkyl groups ($R^1$), followed by drying is believed to result in improved water resistant adhesiveness.

Note that for increasing the water resistant adhesiveness in the adhesive, it is preferred to increase a degree of saponification of the alkyl-modified PVA, to decrease the content of the monomer unit (b), and the like.

The adhesive may contain in addition to the alkyl-modified PVA, a polymer in the state of an emulsion, and/or a filler. Furthermore, the adhesive may contain other additive. Examples of the other additive include: dispersants of a metal salt of a phosphorylated compound such as sodium polyphosphate or sodium hexametaphosphate, and dispersants of an inorganic substance such as a liquid glass; anionic polymer compounds and metal salts thereof such as polyacrylic acid and a salt thereof, sodium alginate, and an α-olefin-maleic anhydride copolymers; nonionic surfactants such as polyethylene oxide, ethylene oxide adducts of higher alcohols, copolymers of ethylene oxide with propylene oxide; cellulose derivatives such as carboxymethyl cellulose and methyl cellulose; and defoaming agents, antiseptic agents, mildew-proofing agents, coloring pigments, deodorants, flavors, and the like.

As a result of containing the polymer in the state of an emulsion, the adhesive can improve the adhesiveness, and decrease the burden during drying due to an increase of the solid content. The polymer contained in the state of an emulsion (hereinafter, may be also referred to as "polymer emulsion") is not particularly limited, and is preferably a polymer (including a copolymer) obtained from at least one monomer selected from the group consisting of an ethylenically unsaturated monomer and a diene monomer.

Examples of the ethylene unsaturated monomer include olefins such as ethylene, propylene and isobutylene, vinyl esters such as vinyl acetate, (meth)acrylic acid esters such as methyl acrylate, ethyl acrylate and butyl acrylate, styrene, and the like.

In addition, examples of the diene monomer include butadiene, isoprene, chloroprene, and the like.

Specific examples of such a polymer emulsion include:
vinyl acetate emulsions such as those of a vinyl acetate polymer, a vinyl acetate-ethylene copolymer, a vinyl acetate-vinyl versatate copolymer and a vinyl acetate-(meth)acrylate ester copolymer;
(meth)acrylate ester emulsions such as those of a methyl methacrylate/n-butyl acrylate copolymer;
styrene emulsions;
butadiene emulsions such as those of a styrene-butadiene copolymer and a methyl methacrylate-butadiene copolymer, and the like.

Among these, vinyl acetate emulsion particles or (meth)acrylate ester emulsion particles are preferred in light of the initial adhesiveness and storage stability of the adhesive.

When the emulsion particles of the polymer are contained together with a dispersion stabilizer, the stability of the state of an emulsion can be improved. As the dispersion stabilizer, a vinyl alcohol polymer, a water soluble cellulose derivative such as hydroxyethyl cellulose, various types of surfactant or the like may be used, and of these, a vinyl alcohol polymer is preferred.

The content of the emulsion which may be used (i.e., the polymer emulsion particles and the dispersion stabilizer) is typically no greater than 1,000 parts by mass, preferably no greater than 700 parts by mass, more preferably no greater than 500 parts by mass and no less than 100 parts by mass with respect to 100 parts by mass of the alkyl-modified PVA on the basis of the solid content.

The adhesive further containing a filler permits the burden during drying due to an increase of the solid content to be decreased, and the strength and hardness after adhesion to be enhanced.

Examples of the filler include:
inorganic fillers such as clays, e.g., kaolinite, halloysite, pyrophyllite and sericite, heavy, light or surface treated calcium carbonate, aluminum hydroxide, aluminum oxide, gypsums, talc, and titanium oxide;
organic fillers such as starches, oxidized starches, wheat flour and wood flours.
Among these, any of various types of clays and various types of starches can be suitably used.

The content of the filler is preferably no greater than 1,000 parts by mass, more preferably no greater than 500 parts by mass, and still more preferably no greater than 400 parts by mass and no less than 50 parts by mass with respect to 100 parts by mass of the alkyl-modified PVA on the basis of the solid content. When the content of the filler exceeds the above upper limit, precipitation of the filler may occur during storage, and thus the storage stability may be deteriorated.

The method for preparing the adhesive is not particularly limited, and a well-known method may be employed. For example, a method in which a mixture of the alkyl-modified PVA and other additive such as a filler which was prepared beforehand is charged into water while stirring, or a method in which a slurry liquid is prepared by charging in sequence various types of additives, a filler and the alkyl-modified PVA into water while stirring, followed by dissolution with heating, and the like may be exemplified. As the process of heating, a well-known heating system may be employed such as a heating system of directly blowing a steam into the slurry liquid, an indirect heating system by a jacket, or the like. This preparation may be carried out by either a batchwise system or a continuous system.

The adhesive is superior in water solubility and initial adhesiveness, as well as storage stability such as viscosity stability and a settling stability. In addition, the water resistance after adhesion can be also enhanced by modifying the structure of the alkyl-modified PVA contained. Therefore, the water soluble adhesive is suitably used as an adhesive for papers used in the production or use of corrugated cardboards, paper bags, paper boxes, paper tubes, wall papers and the like, as well as an adhesive for woodworking used of adhering wood building materials with one another, a wood building material with fibers, a wood building material with a paper, and a wood building material with a plastic. Also, the water soluble adhesive can be also used for intended usage in which a target material of adhesion is fibers such as a fabric or a nonwoven fabric, a cement molding matter such as a concrete, any of various types of plastics, an aluminum foil or the like. It is to be noted that the intended usage of the adhesive according to the aspect of the present invention is not limited thereto.

The viscosity of the adhesive may be arbitrarily selected in accordance with the intended usage. When high-speed coating properties are intended, the viscosity in terms of a B type viscosity is preferably 100 to 10,000 mPa·s at a temperature of adhesion.

<Film>

The film according to one aspect of the present invention contains the alkyl-modified PVA. The film can have superior water repellency of the surface due to including the alkyl-modified PVA.

The content of the alkyl-modified PVA in the film is typically no less than 50% by mass, and more preferably no less than 90% by mass. When the content of the alkyl-modified PVA falls within the above range, the water repellency of the film can be effectively attained.

The film may also contain well-known various types of plasticizer, surfactant, defoaming agent, ultraviolet ray absorbing agent and the like, within the range not to deteriorate the effects of the present invention.

In addition, the film may contain well-known various types of PVA, other water soluble macromolecules such as a starch, carboxymethyl cellulose, methyl cellulose, hydroxymethyl cellulose, hydroxyethyl cellulose or hydroxypropylmethyl cellulose, and the like, similarly within the range not to deteriorate the effects of the present invention. The amount of these other water soluble macromolecules blended in the film is preferably no greater than 50 parts by mass with respect to 100 parts by mass of the alkyl-modified PVA.

The contact angle of the film relative to water is preferably no less than 70°, more preferably no less than 80°, and still more preferably no less than 85°. When the contact angle of the film relative to water is less than 70°, superior water repellency of the surface may not be attained.

The method for producing the film is exemplified by:

(1) a method in which the alkyl-modified PVA in a water-retaining state is subjected to a melt extrusion process to produce a film;

(2) a method in which a stock solution for film production prepared by dissolving the alkyl-modified PVA in a solvent is used to carry out a flow casting film production process or a wet film production process (i.e., a process including discharging the solution into a poor solvent), a gel film production process (i.e., a process including cooling the solution once to allow for gelation, followed by eliminating the solvent by extraction to obtain a film), or a combination of these, and the like.

Of these, a flow casting film production process and a melt extruded film production process are preferred since a favorable film can be obtained.

Examples of the solvent for dissolving the alkyl-modified PVA used when the film of the present invention is produced include dimethyl sulfoxide, dimethylformamide, dimethylacetamide, N-methylpyrrolidone, ethylene glycol, propylene glycol, diethylene glycol, triethylene glycol, tetraethylene glycol, trimethylolpropane, ethylenediamine, diethylenetriamine, glycerin, methanol, ethanol, propanol, water, and the like. These may be used either of one, or two or more types thereof. Among these, water, or a mixed solvent of water and glycerin is suitably used.

The film containing the alkyl-modified PVA has such superior water repellency of the surface, and can be suitably used as, for example, various types of water-repellent coating material, surface covering material, and the like.

EXAMPLES

Hereinafter, the present invention will be explained in detail by way of Examples and Comparative Examples. In the following Examples and Comparative Examples, "part" and "%" are on mass basis unless otherwise specified particularly.

Evaluations of the obtained PVA (alkyl-modified PVA and unmodified PVA) were made in accordance with the following methods.

[Percentage of Modification]

Each percentage of modification involving the content of the monomer unit (a) represented by the formula (I) in a PVA (hereinafter, may be also referred to as "percentage of alkyl modification (i.e., percentage of modification with alkyl)") and the content of the monomer unit (b) having a carboxyl group (hereinafter, may be also referred to as "percentage of itaconic acid modification (i.e., percentage of modification with itaconic acid)") was determined in accordance with a method in which proton NMR was used as described above.

[Degree of Polymerization]

The degree of polymerization of a PVA was determined in accordance with the method described in JIS-K6726.

[Degree of Saponification]

The degree of saponification of a PVA was determined in accordance with the method described in JIS-K6726.

[Water Solubility]

A PVA in an amount of 4 g was added to 96 g of distilled water at room temperature, and the mixture was stirred for 30 min. The temperature of the aqueous PVA solution thus obtained was elevated to 90° C. and the mixture was stirred for 1 hour at the same temperature, followed by cooling to the room temperature, and filtered through a wire mesh of 105 mm φ. After the filtration, the wire mesh was dried at 105° C. for 3 hours, and cooled to the room temperature in a desiccator. Then the mass was measured to determine an increase in the mass of the wire mesh after the filtration. The increase in the mass of the wire mesh after the filtration was defined as a (g), and the undissolved matter content (%) was calculated according to the following formula:

$$\text{undissolved matter content}(\%) = \{a(g)/4(g)\} \times \{100/\text{net}(\%)\} \times 100.$$

It is to be noted that in the formula used for calculating the undissolved matter content, "net (%)" is a value derived using the following formula:

$$\text{net}(\%) = \{\text{mass}(g) \text{ of PVA dried at } 105°\text{ C. for 3 hours}/\text{mass}(g) \text{ of PVA before drying}\} \times 100.$$

The undissolved matter content (%) calculated according to the above formula was evaluated based on the following criteria:

A: less than 0.01%;
B: no less than 0.01% and less than 0.1%;
C: no less than 0.1% and less than 0.5%;
D: no less than 0.5% and less than 1.0%; and
E: no less than 1.0%.

[Water Resistance of Coating Film Composed of PVA]

An aqueous PVA solution having a concentration of 4% was prepared, and subjected to flow casting on a polyethylene terephthalate (PET) film at 20° C. to obtain a coating film having a thickness of 40 μm. The coating film thus obtained was cut into a piece having a size of a length being 5 cm and a width being 5 cm to produce a test piece. The mass (mass A) of the test piece was then measured. After being immersed in distilled water at 20° C. for 24 hours, this test piece was recovered and the moisture attached to the surface was wiped off using a gauze, followed by drying at 105° C. for 16 hours, and thereafter measuring the mass (mass B). The moisture content of the coating film before the immersion was defined as C (% by mass), and the elution percentage (%) was determined according to the following formula:

$$\text{elution percentage}(\%) = [(1-B)/\{(1-C/100) \times A\}] \times 100$$

Thus evaluation was made based on the following criteria. The moisture content of the coating film before the immersion was determined beforehand on the coating film before the immersion which had been otherwise cut out and dried at 105° C. for 4 hours.

A: less than 5.0%;
B: no less than 5.0% and less than 10.0%;
C: no less than 10.0% and less than 20.0%; and
D: no less than 20.0%, or recovery failed due to dissolution of the test piece.

Example 1

Production of PVA 1

Into a 3 L reaction vessel equipped with a stirrer, a reflux condenser, a nitrogen inlet tube, a comonomer dripping port and an addition port of the initiator were charged 750 g of vinyl acetate, 250 g of methanol and 1.1 g of N-octadecylmethacrylamide. Replacement with nitrogen gas in the system was carried out for 30 min by bubbling nitrogen. Also, a comonomer solution was prepared as a delay solution by dissolving N-octadecylmethacrylamide in methanol to give a concentration of 5%, and the comonomer solution was subjected to replacement with nitrogen gas by bubbling of nitrogen gas. Elevation of the temperature of the reaction vessel was started, and 0.25 g of 2,2'-azobisisobutyronitrile (AIBN) was added to initiate the polymerization when an internal temperature of 60° C. was attained. Polymerization was allowed at 60° C. for 3 hours while adding the delay solution dropwise to the reaction vessel such that the monomer composition was kept constant in the polymerization solution, followed by cooling to stop the polymerization. The total amount of the comonomer added until the polymerization was stopped was 4.8 g. In addition, the solid content concentration was 29.9% when the polymerization was stopped. Subsequently, unreacted vinyl acetate monomer was eliminated while adding methanol at 30° C. under a reduced pressure at intervals to obtain a methanol solution of an alkyl-modified vinyl acetate copolymer (alkyl-modified PVAc) (concentration: 35%). Furthermore, 27.9 g of an alkali solution (10% sodium hydroxide solution in methanol) was added to 771.4 g of a methanol solution of the alkyl-modified PVAc (containing 200.0 g of the alkyl-modified PVAc in the solution) prepared by adding methanol to allow for saponification. In this process, the concentration of the alkyl-modified PVAc in the saponification solution was 25%, and the molar ratio of sodium hydroxide to vinyl acetate unit in the alkyl-modified PVAc was 0.03. Gelatinous matter was produced about 1 min after the alkali solution was added. The gelatinous matter was ground with a grinder, and left to stand at 40° C. for 1 hour to allow saponification to proceed. Thereafter, 500 g of methyl acetate was added to neutralize remaining alkali. After confirming the completion of neutralization using a phenolphthalein indicator, the mixture was filtered to obtain a white solid. To the white solid was added 2,000 g of methanol, and left to stand at room temperature for 3 hours to permit washing. After this washing operation was repeated three times, white solid obtained by deliquoring through centrifugation was left to stand in a dryer at 65° C. for 2 days, whereby an alkyl-modified PVA (PVA 1) was obtained.

Examples 2 to 15 and Comparative Examples 1 to 5

Production of PVAs 2 to 15 and PVAs i to v

Various types of alkyl-modified PVA (PVAs 2 to 15 and PVAs i to v) were produced in accordance with a similar method to that of Example 1 except that polymerization conditions such as the amount of vinyl acetate and methanol charged, and the type and the amount of addition of the unsaturated monomer having an alkyl group used in polymerization, as well as saponification conditions such as the concentration of the alkyl-modified PVAc, and the molar ratio of sodium hydroxide to the vinyl acetate unit in saponification, and the like were changed as shown in Table 1.

Example 16

Production of PVA 16

Into a 3 L reaction vessel equipped with a stirrer, a reflux condenser, a nitrogen inlet tube, a comonomer dripping port and an addition port of the initiator were charged 750 g of vinyl acetate, 250 g of methanol, 1.1 g of N-octadecylmethacrylamide and 0.7 g of itaconic acid. Replacement with nitrogen gas in the system was carried out for 30 min by bubbling nitrogen. Also, as delay solutions a comonomer solutions was prepared by dissolving N-octadecylmethacrylamide in methanol to give a concentration of 5%, and, and a comonomer solution was prepared by dissolving itaconic acid in a methanol solution to give a concentration of 25%. Then these comonomer solutions were subjected to replacement with nitrogen gas by bubbling of nitrogen gas. Elevation of the temperature of the reaction vessel was started, and 0.3 g of 2,2'-azobisisobutyronitrile (AIBN) was added to initiate the polymerization when an internal temperature of 60° C. was attained. Polymerization was allowed at 60° C. for 3 hours while adding the delay solution dropwise such that the monomer composition (i.e., proportions of vinyl acetate, N-octadecylmethacrylamide and itaconic acid) was kept constant in the polymerization solution, followed by cooling to stop the polymerization. The total amount of the N-octadecylmethacrylamide added until the polymerization was stopped was 4.8 g, and the total amount of itaconic acid added until the polymerization was 9.6 g. In addition, the solid content concentration was 29.9% when the polymerization was stopped. Subsequently, unreacted vinyl acetate monomer was eliminated while adding methanol at 30° C. under a reduced pressure at intervals to obtain a methanol solution of an alkyl-itaconic acid-modified vinyl acetate polymer (alkyl-itaconic acid-modified PVAc) (concentration: 35%). Furthermore, 93.2 g of an alkali solution (10% sodium hydroxide solution in methanol) was added to 706.9 g of a methanol solution of alkyl-itaconic acid-modified PVAc (containing 200.0 g of alkyl-itaconic acid-modified PVAc in the solution) prepared by adding methanol to allow for saponification. In this process, the concentration of the alkyl-itaconic acid-modified PVAc in the saponification solution was 25%, and the molar ratio of sodium hydroxide to vinyl acetate unit in the alkyl-itaconic acid-modified PVAc was 0.1. Gelatinous matter was produced about 1 min after the alkali solution was added. The gelatinous matter was ground with a grinder, and left to stand at 40° C. for 1 hour to allow saponification to proceed. Thereafter, 500 g of methyl acetate was added to neutralize remaining alkali. After confirming the completion of neutralization using a phenolphthalein indicator, the mixture was filtered to obtain a white solid. To the white solid was added 2,000 g of methanol, and left to stand at room temperature for 3 hours to permit washing. After this washing operation was repeated three times, white solid obtained by deliquoring through centrifugation was left to stand in a dryer at 65° C. for 2 days, whereby an alkyl-itaconic acid-modified PVA (PVA 16) was obtained.

Comparative Example 6

Production of PVA vi

Into a 3 L reaction vessel equipped with a stirrer, a reflux condenser, a nitrogen inlet tube and an addition port of the initiator were charged 750 g of vinyl acetate, 250 g of methanol and 57.3 g of octadecyl vinyl ether. Replacement with nitrogen gas in the system was carried out for 30 min by bubbling nitrogen. Elevation of the temperature of the reaction vessel was started, and 1.0 g of 2,2'-azobisisobutyronitrile (AIBN) was added to initiate the polymerization when an internal temperature of 60° C. was attained. After polymerization was allowed at 60° C. for 2 hours, the mixture was cooled to stop the polymerization. The solid content concentration was 30.4% when the polymerization was stopped. Subsequently, unreacted vinyl acetate monomer was eliminated while adding methanol at 30° C. under a reduced pressure at intervals to obtain a methanol solution of an alkyl-modified vinyl acetate copolymer (alkyl-modified PVAc) (concentration: 35%). Furthermore, 7.0 g of an alkali solution (10% sodium hydroxide solution in methanol) was added to 792.9 g of a methanol solution of an alkyl-modified PVAc (containing 200.0 g of an alkyl-modified PVAc in the solution) prepared by adding methanol to allow for saponification. In this process, the concentration of the alkyl-modified PVAc in the saponification solution was 25%, and the molar ratio of sodium hydroxide to vinyl acetate unit in the alkyl-modified PVAc was 0.0075. Gelatinous matter was produced about 12 min after the alkali solution was added. The gelatinous matter was ground with a grinder, and left to stand at 40° C. for 1 hour to allow the saponification to proceed. Thereafter, 500 g of methyl acetate was added to neutralize remaining alkali. After confirming the completion of neutralization using a phenolphthalein indicator, the mixture was filtered to obtain a white solid. To the white solid was added 2,000 g of methanol, and left to stand at room temperature for 3 hours to permit washing. After this washing operation was repeated three times, white solid obtained by deliquoring through centrifugation was left to stand in a dryer at 65° C. for 2 days, whereby an alkyl-modified PVA (PVA vi) was obtained.

Comparative Example 7

Production of PVA vii

An alkyl-modified PVA (PVA vii) was produced in accordance with a similar method to that of Comparative Example 6 except that lauryl vinyl ether was used as the unsaturated monomer having an alkyl group.

Comparative Example 8

Production of PVA viii

Into a 3 L reaction vessel equipped with a stirrer, a reflux condenser, a nitrogen inlet tube and an addition port of the initiator were charged 900 g of vinyl acetate and 100 g of methanol. Replacement with nitrogen gas in the system was carried out for 30 min by bubbling nitrogen. Elevation of the temperature of the reaction vessel was started, and 0.25 g of 2,2'-azobisisobutyronitrile (AIBN) was added to initiate the polymerization when an internal temperature of 60° C. was attained. After polymerization was allowed at 60° C. for 3 hours, the mixture was cooled to stop the polymerization. The solid content concentration was 31.0% when the polymerization was stopped. Subsequently, unreacted vinyl acetate monomer was eliminated while adding methanol at 30° C. under a reduced pressure at intervals to obtain a methanol solution of polyvinyl acetate (PVAc) (concentration: 30%). Furthermore, 27.9 g of an alkali solution (10% sodium hydroxide solution in methanol) was added to 971.1 g of a methanol solution of PVAc (containing 200.0 g of PVAc in the solution) prepared by adding methanol to allow for saponification. In this process, the concentration of the PVAc in the saponification solution was 20%, and the molar ratio of sodium hydroxide to vinyl acetate unit in the PVAc was 0.03. Gelatinous matter was produced about 1 min after the alkali solution was added. The gelatinous matter was ground with a grinder, and left to stand at 40° C. for 1 hour to allow saponification to proceed. Thereafter, 500 g of methyl acetate was added to neutralize remaining alkali. After confirming the completion of neutralization using a phenolphthalein indicator, the mixture was filtered to obtain a white solid. To the white solid was added 2,000 g of methanol, and left to stand at room temperature for 3 hours to permit washing. After this washing operation was repeated three times, white solid obtained by deliquoring through centrifugation was left to stand in a dryer at 65° C. for 2 days, whereby an unmodified PVA (PVA viii) was obtained.

The degree of polymerization, the percentage of modification, the degree of saponification and the water solubility of each PVA obtained, and the water resistance of the coating film was evaluated in accordance with the methods described above. The results of evaluation are shown in Table 1.

TABLE 1

| | | Charge [1] | | | | | Percentage of polymerization (%) | PVAc concentration (%) | Saponification condition NaOH molar ratio [2] |
|---|---|---|---|---|---|---|---|---|---|
| | | vinyl acetate (g) | methanol (g) | unsaturated monomer | | | | | |
| | PVA | | | $R^1$ | $R^2$ | amount (g) | | | |
| Example 1 | PVA 1 | 750 | 250 | $C_{18}H_{37}$ | $CH_3$ | 4.8 | 40 | 25 | 0.0300 |
| Example 2 | PVA 2 | 850 | 150 | $C_{18}H_{37}$ | $CH_3$ | 4.9 | 30 | 25 | 0.0300 |
| Example 3 | PVA 3 | 900 | 100 | $C_{18}H_{37}$ | $CH_3$ | 4.9 | 30 | 20 | 0.0300 |
| Example 4 | PVA 4 | 400 | 600 | $C_{18}H_{37}$ | $CH_3$ | 3.4 | 50 | 30 | 0.0300 |
| Example 5 | PVA 5 | 750 | 250 | $C_{18}H_{37}$ | $CH_3$ | 4.8 | 40 | 25 | 0.0075 |
| Example 6 | PVA 6 | 750 | 250 | $C_{18}H_{37}$ | $CH_3$ | 4.8 | 40 | 25 | 0.0070 |
| Example 7 | PVA 7 | 550 | 450 | $C_{18}H_{37}$ | $CH_3$ | 3.6 | 40 | 25 | 0.0050 |
| Example 8 | PVA 8 | 750 | 250 | $C_{18}H_{37}$ | $CH_3$ | 1.2 | 40 | 25 | 0.0078 |
| Example 9 | PVA 9 | 750 | 250 | $C_{12}H_{25}$ | $CH_3$ | 12.0 | 40 | 25 | 0.0070 |
| Example 10 | PVA 10 | 750 | 250 | $C_{12}H_{25}$ | $CH_3$ | 3.8 | 40 | 25 | 0.0300 |
| Example 11 | PVA 11 | 750 | 250 | $C_8H_{17}$ | $CH_3$ | 19.3 | 40 | 25 | 0.0068 |
| Example 12 | PVA 12 | 750 | 250 | $C_{10}H_{21}$ | $CH_3$ | 3.6 | 40 | 25 | 0.0300 |
| Example 13 | PVA 13 | 750 | 250 | $C_{26}H_{53}$ | $CH_3$ | 7.1 | 40 | 25 | 0.0300 |
| Example 14 | PVA 14 | 750 | 250 | $C_{18}H_{37}$ | H | 4.8 | 40 | 25 | 0.0075 |
| Example 15 | PVA 15 | 750 | 250 | $C_{18}H_{37}$ | $CH_3$ | 3.6 | 40 | 25 | 0.0075 |
| Example 16 [3] | PVA 16 | 750 | 250 | $C_{18}H_{37}$ | $CH_3$ | 4.8 | 40 | 25 | 0.1000 |

TABLE 1-continued

| | | polymerization degree | | | | | | | |
|---|---|---|---|---|---|---|---|---|---|
| Comparative Example 1 | PVA i | 100 | 900 | $C_{18}H_{37}$ | $CH_3$ | 1.1 | 50 | 40 | 0.0300 |
| Comparative Example 2 | PVA ii | 400 | 600 | $C_{18}H_{37}$ | $CH_3$ | 3.4 | 50 | 30 | 0.0020 |
| Comparative Example 3 | PVA iii | 750 | 250 | $C_8H_{17}$ | $CH_3$ | 42.1 | 40 | 25 | 0.0060 |
| Comparative Example 4 | PVA iv | 750 | 250 | $C_5H_{11}$ | $CH_3$ | 2.4 | 40 | 25 | 0.0300 |
| Comparative Example 5 | PVA v | 750 | 250 | $C_{30}H_{61}$ | $CH_3$ | 8.2 | 40 | 25 | 0.0300 |
| Comparative Example 6 | PVA vi | 750 | 250 | octadecyl vinyl ether | | 57.3 | 40 | 25 | 0.0075 |
| Comparative Example 7 | PVA vii | 750 | 250 | lauryl vinyl ether | | 53.8 | 40 | 25 | 0.0075 |
| Comparative Example 8 | PVA viii | 900 | 100 | — | | | 35 | 20 | 0.0300 |

| | Results of polymerization | | | | |
|---|---|---|---|---|---|
| | polymerization degree | percentage of modification (mol %) | degree of saponification (mol %) | Water solubility | Water resistance |
| Example 1 | 1,700 | 0.4 | 98.5 | A | A |
| Example 2 | 2,400 | 0.4 | 98.5 | A | A |
| Example 3 | 3,000 | 0.4 | 98.5 | A | A |
| Example 4 | 500 | 0.4 | 98.5 | A | A |
| Example 5 | 1,700 | 0.4 | 88 | A | B |
| Example 6 | 1,700 | 0.4 | 80 | A | C |
| Example 7 | 1,000 | 0.4 | 60 | C | D |
| Example 8 | 1,700 | 0.08 | 88 | A | C |
| Example 9 | 1,700 | 1.2 | 88 | B | B |
| Example 10 | 1,700 | 0.4 | 98.5 | A | B |
| Example 11 | 1,700 | 2.5 | 88 | C | B |
| Example 12 | 1,700 | 0.4 | 98.5 | A | B |
| Example 13 | 1,700 | 0.4 | 98.5 | C | A |
| Example 14 | 1,700 | 0.4 | 88 | A | B |
| Example 15 | 1,700 | 0.25 | 88 | A | C |
| Example 16 [3] | 1,700 | 0.4/2.0 [4] | 98.5 | A | D |
| Comparative Example 1 | 100 | 0.4 | 98.5 | A | D |
| Comparative Example 2 | 500 | 0.4 | 10 | E | — |
| Comparative Example 3 | 1,700 | 5.5 | 88 | E | — |
| Comparative Example 4 | 1,700 | 0.4 | 98.5 | A | D |
| Comparative Example 5 | 1,700 | 0.4 | 98.5 | E | — |
| Comparative Example 6 | 1,700 | 0.8 | 88 | E | — |
| Comparative Example 7 | 1,700 | 1 | 88 | E | — |
| Comparative Example 8 | 3,000 | — | 98.5 | A | D |

[1] In Comparative Examples 6 and 7, 1.0 g of 2,2'-azobisisobutyronitrile (AIBN) was used as a polymerization initiator. In Example 16, 0.3 g of AIBN was used. In other Examples and Comparative Examples, 0.25 g of AIBN was used.
[2] molar ratio of sodium hydroxide (NaOH) to the vinyl acetate unit in the alkyl-modified PVAc
[3] polymerization carried out using vinyl acetate, N-octadecylmethacrylamide and itaconic acid
[4] percentage of alkyl modification/percentage of itaconic acid modification As shown in Table 1, the alkyl-modified PVA of the present invention was superior in water solubility, and had higher water resistance as compared with the unmodified PVAs having a comparable degree of polymerization (Example 3 and Comparative Example 8). Moreover, the alkyl-modified PVA of the present invention also had higher water solubility as compared with the alkyl-modified PVA having a similar length of the alkyl chain, and excellent handleability was provided (Example 5 and Comparative Example 6). However, in the cases in which: the degree of saponification was low (Comparative Example 2); the percentage of modification was high (Comparative Example 3); and the number of carbon atoms of the alkyl chain was greater than 29 (Comparative Example 5), a large quantity of undissolved matter was found in the aqueous solution. In addition, the alkyl-modified PVA into which the monomer unit (b) having a carboxyl group was introduced was superior in water solubility but had low water resistance (Example 16).

Examples 17 to 32 and Comparative Examples 9 to 16

Thickener and Composition

Using each PVA obtained as a thickener of Examples 17 to 32 and Comparative Examples 9 to 16, the following evaluations were made. In addition, the composition containing the thickener (PVA) was evaluated in accordance with the following methods. The results of evaluation are shown in Table 2.

[Thickening Properties (Viscosity of Aqueous PVA Solution)]

In accordance with a similar method to that described above, an aqueous PVA solution having a concentration of 4% was prepared, and a viscosity at a temperature of 20° C. was measured using a B type viscometer at a number of revolution of the rotor of 6 rpm.

[Thickening Properties (Thickening Test of Ethylene-Vinyl Acetate Copolymer Emulsion)]

To 100 parts of an ethylene-vinyl acetate copolymer emulsion (manufactured by Kuraray Co., Ltd., OM-4200NT; concentration: 55%) were added 20.6 parts of an aqueous PVA solution having a concentration of 4% (the solid content of PVA being 1.5 parts with respect to 100 parts of the solid content of the emulsion) and 2.4 parts of water to produce a mixed solution of PVA and the emulsion having a concentration of 45%, and a viscosity at a temperature of 20° C. was measured using a B type viscometer at a number of revolution of the rotor of 6 rpm. The evaluation was made based on the following criteria:

A: no less than 10,000 mPa·s;
B: no less than 5,000 mPa·s and less than 10,000 mPa·s;
C: no less than 1,000 mPa·s and less than 5,000 mPa·s;
D: no less than 500 mPa·s and less than 1,000 mPa·s; and
E: less than 500 mPa·s.

[Storage Stability of Ethylene-Vinyl Acetate Copolymer Emulsion]

The solution used for the thickening test was stored in a dryer at 50° C., and the number of days required until separation of the emulsion layer and the water layer was determined, and the evaluation was made based on the following criteria:

A: no less than 30 days;
B: no less than 15 days and less than 30 days;
C: no less than 7 days and less than 15 days;
D: no less than 3 days and less than 7 days; and
E: less than 3 days.

TABLE 2

| | | Unsaturated monomer | | Results of polymerization | | | Thickening property | Results of test on addition of emulsion [1] | |
|---|---|---|---|---|---|---|---|---|---|
| | PVA | $R^1$ | $R^2$ | polymerization degree | percentage of modification (mol %) | saponification degree (mol %) | viscosity [2] (mPa·s) | thickening property | storage stability |
| Example 17 | PVA 1 | $C_{18}H_{37}$ | $CH_3$ | 1,700 | 0.4 | 98.5 | >100,000 | A | A |
| Example 18 | PVA 2 | $C_{18}H_{37}$ | $CH_3$ | 2,400 | 0.4 | 98.5 | >100,000 | A | A |
| Example 19 | PVA 3 | $C_{18}H_{37}$ | $CH_3$ | 3,000 | 0.4 | 98.5 | >100,000 | A | A |
| Example 20 | PVA 4 | $C_{18}H_{37}$ | $CH_3$ | 500 | 0.4 | 98.5 | 320 | D | D |
| Example 21 | PVA 5 | $C_{18}H_{37}$ | $CH_3$ | 1,700 | 0.4 | 88 | >100,000 | A | A |
| Example 22 | PVA 6 | $C_{18}H_{37}$ | $CH_3$ | 1,700 | 0.4 | 80 | >100,000 | A | A |
| Example 23 | PVA 7 | $C_{18}H_{37}$ | $CH_3$ | 1,000 | 0.4 | 60 | 4,000 | C | C |
| Example 24 | PVA 8 | $C_{18}H_{37}$ | $CH_3$ | 1,700 | 0.08 | 88 | 700 | D | D |
| Example 25 | PVA 9 | $C_{12}H_{25}$ | $CH_3$ | 1,700 | 1.2 | 88 | 85,000 | B | A |
| Example 26 | PVA 10 | $C_{12}H_{25}$ | $CH_3$ | 1,700 | 0.4 | 98.5 | 10,000 | B | B |
| Example 27 | PVA 11 | $C_8H_{17}$ | $CH_3$ | 1,700 | 2.5 | 88 | 60,000 | B | B |
| Example 28 | PVA 12 | $C_{10}H_{21}$ | $CH_3$ | 1,700 | 0.4 | 98.5 | 1,000 | C | C |
| Example 29 | PVA 13 | $C_{26}H_{53}$ | $CH_3$ | 1,700 | 0.4 | 98.5 | >100,000 | A | A |
| Example 30 | PVA 14 | $C_{18}H_{37}$ | H | 1,700 | 0.4 | 88 | >100,000 | A | A |
| Example 31 | PVA 15 | $C_{18}H_{37}$ | $CH_3$ | 1,700 | 0.25 | 88 | >100,000 | A | A |
| Example 32 [3] | PVA 16 | $C_{18}H_{37}$ | $CH_3$ | 1,700 | 0.4/2.0 [4] | 98.5 | >100,000 | A | A |
| Comparative Example 9 | PVA i | $C_{18}H_{37}$ | $CH_3$ | 100 | 0.4 | 98.5 | 30 | E | E |
| Comparative Example 10 | PVA ii | $C_{18}H_{37}$ | $CH_3$ | 500 | 0.4 | 10 | — | — | — |
| Comparative Example 11 | PVA iii | $C_8H_{17}$ | $CH_3$ | 1,700 | 5.5 | 88 | — | — | — |
| Comparative Example 12 | PVA iv | $C_5H_{11}$ | $CH_3$ | 1,700 | 0.4 | 98.5 | 60 | E | E |
| Comparative Example 13 | PVA v | $C_{30}H_{61}$ | $CH_3$ | 1,700 | 0.4 | 98.5 | — | — | — |
| Comparative Example 14 | PVA vi | octadecyl vinyl ether | | 1,700 | 0.8 | 88 | — | — | — |
| Comparative example 15 | PVA vii | lauryl vinyl ether | | 1,700 | 1 | 88 | — | — | — |
| Comparative Example 16 | PVA viii | — | | 3,000 | — | 98.5 | 90 | E | E |

[1] thickening test of ethylene-vinyl acetate copolymer emulsion
[2] measurement limit of the viscosity being 100,000 mPa·s
[3] polymerization carried out using vinyl acetate, N-octadecylmethacrylamide and itaconic acid
[4] percantage of alkyl modification/percentage of itaconic acid modification It is to be noted that "-" in Table 2 denotes that PVA was not completely dissolved, indicating unfavorability as a thickener.

As shown in Table 2, the alkyl-modified PVA contained in the thickener of the present invention has more superior thickening property as compared with the unmodified PVA having a comparable degree of polymerization. Thus, very superior performances can be achieved in terms of storage stability and thickening effects of the emulsion (i.e., composition). Furthermore, also when compared with the alkyl-modified PVA having a similar length of the alkyl chain (Comparative Example 14), the alkyl-modified PVA contained in the thickener of the present invention has higher water solubility, and excellent handleability as a thickener was provided. However, in the case in which the alkyl chain has more than 29 carbon atoms (i.e., Comparative Example 13) and the like, a large quantity of undissolved matter remained in the aqueous solution, whereby unsuitability as a thickener was ascertained.

[Adhesion Test of Wood Building Material]

To a PVAc emulsion stabilized with "POVAL" PVA-217 manufactured by Kuraray Co., Ltd. (including 7.5 parts of PVA-217 added to 100 parts of PVAc) was added the PVA 14 to produce an aqueous emulsion adhesive having a total solid content of 35%, a viscosity at 20° C. and at 6 rpm of 10,000 mPa·s, and containing 4 parts of phenoxyethanol with respect to 100 parts of PVAc.

The aqueous emulsion adhesive in an amount of 200 g/m² was coated on a hemlock timber, and immediately a piece of hemlock timber of the same type was pasted thereon, followed by clamping under a pressure of 7 kg/cm² for 24 hours. Thereafter, the pressure was released, and aging was carried out at 20° C. and 65% RH for 7 days to produce ten test pieces. Of these, five test pieces were used to determine the compression shear strength in accordance with JIS K-6852, revealing the adhesion strength of 118.3 kg/cm², accompanied by material fracture of all test pieces used. In addition, the remaining five test pieces were immersed in water at 30° C., and thereafter the compression shear strength was similarly determined, revealing the adhesion strength of 21.4 kg/cm².

In addition, when the adhesion test of the wood building material was performed in accordance with a similar manner to the method described above except that PVA 15 was not added, and that only a PVAc emulsion containing 4 parts of phenoxyethanol was used, the adhesion strength was 113.0 kg/cm² (all accompanied by material fracture), and 22.8 kg/cm², respectively.

In general, when an urethane or cellulosic compound is added to an emulsion, water resisting adhesion strength is lowered. However, even though the alkyl-modified PVA of the present invention was thus added to the emulsion, lowering of the water resisting adhesion strength was scarcely found.

Examples 33 to 48 and Comparative Examples 17 to 24

Coating Material for Papers

Using each PVA obtained, coating materials for papers of Examples 33 to 48 and Comparative Examples 17 to 24 were obtained in accordance with the following method. Each coating material for papers obtained was evaluated according to the following method. The results of evaluation are shown in Table 3.

[Production of Thermal Paper Over Coating Layer]

Aluminum hydroxide powder (manufactured by Showa Denko K.K., HIGILITE™ H42) in an amount of 90 g was charged into 210 g of distilled water, and the mixture was stirred by hand. Thereafter, the mixture was stirred using a homomixer (manufactured by IKA-Labortechnik, type T-25-SI) at a rotation speed of 13,500 rpm for 5 min to prepare a dispersion liquid of aluminum hydroxide (aluminum hydroxide concentration: 30%). Separately therefrom, each PVA obtained was dissolved in hot water at 95° C., whereby an aqueous PVA solution having a concentration of 4% was prepared. Next, 150 g of the aqueous PVA solution was added to 20 g of the dispersion liquid of the aluminum hydroxide, and both solutions were admixed homogeneously, followed by adding distilled water to give a solid content concentration of 4%, whereby a coating material was obtained. Subsequently, the coating material was hand coated on the surface of a commercially available thermal paper (manufactured by KOKUYO Co., Ltd) using a wire bar No. 60 (manufactured by ETO), and thereafter the coated surface was dried using a hot-air dryer at 50° C. for 1 hour. Next, the dried thermal paper was left to stand in a room in which the temperature had been adjusted to 20° C. and the relative humidity had been adjusted to 65% for 3 hours to give a sample for evaluation of characteristics (water resistance, blocking resistance) of the thermal paper over coating layer formed from the coating material.

[Water Resistance]

After the sample was immersed in water at 20° C. for 10 min, the coated surface was rubbed with a finger ten times, and the state of abrasion caused on the surface was observed. The water resistance of the layer formed from the coating material was evaluated with respect to the observed state, based on the following criteria on a scale of five:

(Evaluation Criteria of Water Resistance)
5: any abrasion on the surface not observed;
4: abrasion on the surface slightly observed;
3: abrasion on the surface somewhat observed;
2: abrasion on the surface significantly observed; and
1: abrasion on almost the entire surface observed.

[Blocking Resistance (Surface Water Resistance)]

After the sample was left to stand in an atmosphere of 40° C. for 72 hours, the sample was cut into a square of 5×5 cm. Next, after one drop (about 30 μL) of water was placed on the coated surface, other sample on which a water droplet was not placed was overlaid such that the coated surfaces were brought into contact, and air drying was allowed. After drying, the samples were detached away, and the state of abrasion was observed. The blocking resistance of the layer formed from the coating material was evaluated with respect to the observed state, based on the following criteria on a scale of three:

(Evaluation Criteria of Blocking Resistance)
3: spontaneously detached without need of particularly directing force;
2: the surfaces partially adhered, without occurrence of breaking, etc., of the sample; and
1: the surfaces adhered, with occurrence of breaking of the sample upon detachment.

[Production of Ink Jet Recording Paper]

Using each PVE obtained, 1,000 g of an aqueous solution having a solid content concentration of 4% was prepared, and the aqueous PVA solution was added to 1,000 g of a dispersion liquid of silica prepared by a gas-phase process (Aerosil A300: manufactured by NIPPON AEROSIL CO., LTD.) having a solid content concentration of 20%. A dispersion liquid was obtained by intimately stirring the mixture. Thereafter, distilled water was added to prepare a coating liquid (coating material for papers) having a solid content concentration of 12% by mass. A solution viscosity of the coating liquid measured using a B type viscometer at a number of revolution of the rotor of 6 rpm, under a condition involving a temperature of 20° C. was 100 mPa·s. On the surface of a PET film which had been subjected to a corona treatment, the coating liquid was coated using a Meyer bar such that the amount of coated material after drying was 15 g/m² at 30° C., and dried using a hot-air dryer at 150° C. for 3 min, whereby an ink jet recording paper was produced.

[Evaluation of Ink Jet Recording Paper]

An ink jet recording paper was produced in accordance with the method described above, and generation of crack(s) of an ink receiving layer thereof was evaluated based on the following criteria.

[Crack]

The surface of the ink receiving layer was observed under an optical microscope at 100× magnification, and evaluated based on the following criteria on a scale of five:
5: any crack on the surface not observed;
4: crack scarcely observed on the surface;
3: cracks partially generated on the surface;
2: a large number of cracks generated on the surface; and
1: cracks generated on the entire surface.

[Production of Base Paper of Release Paper]

The aqueous PVA solution having a concentration of 4% (coating material for papers) was hand coated on a semiglassine paper having a basis weight of 80 g/m² and an air permeability of 140 sec, using a Meyer bar such that the amount of coated material was 0.1 g/m², and dried using a hot-air dryer at 110° C. for 1 min. Thereafter, the moisture was conditioned at 20° C. and 65% RH for 72 hours, and a super calendar treatment was carried out once under a condition involving 150° C., 250 Kg/cm and 10 m/min. The base paper of a release paper thus obtained was subjected to an air permeability test in accordance with the method described below.

[Air permeability Test of Base Paper of Release Paper]

In accordance with JIS-P8117, the air permeability of the base paper of a release paper was determined using Oken Smoothness-Air permeability Tester, and evaluated based on the following criteria on a scale of five.

5: no less than 50,000 sec;
4: no less than 30,000 sec and less than 50,000 sec;
3: no less than 10,000 sec and less than 30,000 sec;
2: no less than 1,000 sec and less than 10,000 sec; and
1: less than 1,000 sec.

[Comprehensive Evaluation of Coating Material for Papers]

Comprehensive evaluation: A comprehensive evaluation was carried out based on the total score from the aforementioned four evaluation items, and the results of the evaluation were defined as performance evaluation of the PVAs. Example 33 in which PVA 1 was used exhibited the score of 15. It is to be noted that the PVAs were evaluated as: acceptable when the score was no less than 10; and unacceptable when the score was less than 10.

TABLE 3

| | | Unsaturated monomer | | Results of polymerization | | | Thermal paper evaluation | | Ink jet paper | Release paper air | Total |
|---|---|---|---|---|---|---|---|---|---|---|---|
| | PVA | $R^1$ | $R^2$ | degree of polymerization | percentage of modification (mol %) | degree of saponification (mol %) | water resistance | blocking resistance | crack | permeability | score |
| Example 33 | PVA 1 | $C_{18}H_{37}$ | $CH_3$ | 1,700 | 0.4 | 98.5 | 5 | 3 | 3 | 4 | 15 |
| Example 34 | PVA 2 | $C_{18}H_{37}$ | $CH_3$ | 2,400 | 0.4 | 98.5 | 5 | 3 | 4 | 5 | 17 |
| Example 35 | PVA 3 | $C_{18}H_{37}$ | $CH_3$ | 3,000 | 0.4 | 98.5 | 5 | 3 | 5 | 5 | 18 |
| Example 36 | PVA 4 | $C_{18}H_{37}$ | $CH_3$ | 500 | 0.4 | 98.5 | 4 | 3 | 2 | 3 | 12 |
| Example 37 | PVA 5 | $C_{18}H_{37}$ | $CH_3$ | 1,700 | 0.4 | 88 | 4 | 2 | 4 | 4 | 14 |
| Example 38 | PVA 6 | $C_{18}H_{37}$ | $CH_3$ | 1,700 | 0.4 | 80 | 3 | 2 | 4 | 4 | 13 |
| Example 39 | PVA 7 | $C_{18}H_{37}$ | $CH_3$ | 1,000 | 0.4 | 60 | 2 | 2 | 3 | 3 | 10 |
| Example 40 | PVA 8 | $C_{18}H_{37}$ | $CH_3$ | 1,700 | 0.08 | 88 | 3 | 2 | 2 | 3 | 10 |
| Example 41 | PVA 9 | $C_{12}H_{25}$ | $CH_3$ | 1,700 | 1.2 | 88 | 4 | 2 | 4 | 5 | 15 |
| Example 42 | PVA 10 | $C_{12}H_{25}$ | $CH_3$ | 1,700 | 0.4 | 98.5 | 4 | 3 | 3 | 4 | 14 |
| Example 43 | PVA 11 | $C_8H_{17}$ | $CH_3$ | 1,700 | 2.5 | 88 | 4 | 3 | 5 | 5 | 17 |
| Example 44 | PVA 12 | $C_{10}H_{21}$ | $CH_3$ | 1,700 | 0.4 | 98.5 | 5 | 3 | 3 | 4 | 15 |
| Example 45 | PVA 13 | $C_{26}H_{53}$ | $CH_3$ | 1,700 | 0.4 | 98.5 | 5 | 3 | 3 | 5 | 16 |
| Example 46 | PVA 14 | $C_{18}H_{37}$ | H | 1,700 | 0.4 | 88 | 4 | 2 | 4 | 5 | 15 |
| Example 47 | PVA 15 | $C_{18}H_{37}$ | $CH_3$ | 1,700 | 0.25 | 88 | 3 | 2 | 3 | 3 | 11 |
| Example 48 [1)] | PVA 16 | $C_{18}H_{37}$ | $CH_3$ | 1,700 | 0.4/2.0 [2)] | 98.5 | 2 | 2 | 3 | 3 | 10 |
| Comparative Example 17 | PVA i | $C_{18}H_{37}$ | $CH_3$ | 100 | 0.4 | 98.5 | 1 | 1 | 1 | 1 | 4 |
| Comparative Example 18 | PVA ii | $C_{18}H_{37}$ | $CH_3$ | 500 | 0.4 | 10 | — | — | — | — | 0 |
| Comparative Example 19 | PVA iii | $C_8H_{17}$ | $CH_3$ | 1,700 | 5.5 | 88 | — | — | — | — | 0 |
| Comparative Example 20 | PVA iv | $C_5H_{11}$ | $CH_3$ | 1,700 | 0.4 | 98.5 | 2 | 1 | 2 | 3 | 8 |
| Comparative Example 21 | PVA v | $C_{30}H_{61}$ | $CH_3$ | 1,700 | 0.4 | 98.5 | — | — | — | — | 0 |
| Comparative Example 22 | PVA vi | octadecyl vinyl ether | | 1,700 | 0.8 | 88 | — | — | — | — | 0 |
| Comparative Example 23 | PVA vii | lauryl vinyl ether | | 1,700 | 1 | 88 | — | — | — | — | 0 |
| Comparative Example 24 | PVA viii | — | | 3,000 | — | 98.5 | 2 | 1 | 4 | 2 | 9 |

[1)] polymerization carried out using vinyl acetate, N-octadecylmethacrylamide and itaconic acid
[2)] percentage of alkyl modification/percentage of itaconic acid modification It is to be noted that "-" in Table 3 denotes that PVA was not completely dissolved, indicating unfavorability as a coating material for papers.

The alkyl-modified PVA contained in the coating material for papers of the present invention was superior in water solubility, and had higher water resistance as compared with the unmodified PVAs having a comparable degree of polymerization (Example 35 and Comparative Example 24). Moreover, the alkyl-modified PVA of the present invention also had higher water solubility as compared with the alkyl-modified PVA having a similar length of the alkyl chain, and excellent handleability as a coating material for papers was provided (Comparative Example 22). Furthermore, in the cases in which: the degree of saponification was low (Comparative Example 18); the percentage of alkyl modification was high (Comparative Example 19); and the number of carbon atoms of the alkyl chain was greater than 29 (Comparative Example 21), a large quantity of undissolved matter remained in the aqueous solution, whereby unsuitability as a coating material for papers was ascertained.

Examples 49 to 64 and Comparative Examples 25 to 32

Adhesive

Each PVA shown in Table 4 in an amount of 40 parts was added to 960 parts of ion exchanged water at a normal temperature, and the temperature of the mixture was elevated to 95° C. while stirring for 1 hour. After maintaining the temperature at 95° C. for 2 hours, the mixture was cooled while stirring to the normal temperature, whereby 4% aqueous PVA solutions were obtained, respectively.

These aqueous PVA solutions were designated as adhesives of Examples 49 to 64 and Comparative Examples 25 to 32, and evaluations of the initial adhesiveness, storage stability and water resistant adhesiveness were made in accordance with the following methods. The results are shown in Table 4.

[Initial Adhesiveness]

Using an initial adhesion tester manufactured by Japan Tobacco Inc., initial adhesive strength was measured under the following condition.

Condition: kraft paper/kraft paper adhesion;
coating speed: 0.5 m/sec;
shear rate: 300 mm/sec;
open time: 1 sec;
pressure bonding time: 2 sec;
aging time: 1 sec, 3 sec, 5 sec, 10 sec;
adhesion area: 1 mm×25 mm, 8 points (2 cm² in total); and
temperature and humidity: 20° C. and 65% RH.

[Storage Stability]

The state after the adhesive was left to stand at 40° C. for 7 days was observed, and the evaluation was made from the change of the state after the storage as compared with the state before the storage based on the following criteria:

A: separation and/or precipitation not found, without change in the viscosity;

B: separation and/or precipitation slightly found, but flowability present; and

C: separation and/or precipitation found, or flowability absent.

[Water Resistant Adhesiveness]

The adhesive was coated on a kraft paper using a wire bar so as to provide a solid content of 10 g/m², and a kraft paper was pasted thereon. The kraft papers were aged at 20° C. and 65% RH for 24 hours, and thereafter immersed in water at 30° C. for 30 sec. After the kraft paper containing water was briefly wiped using a filter paper to remove the moisture, the peel strength at 180° of the adhesion layer was measured using an autograph, and evaluated based on the following criteria:

A: the kraft paper torn;
B: no less than 1 kg/cm²; and
C: less than 1 kg/cm².

TABLE 4

| | | Unsaturated monomer | | Results of polymerization | | | Initial adhesive strength (g/cm) | | | | Storage stability | Water resistant adhesiveness |
| | | | | degree of polymerization | percentage of modification (mol %) | degree of saponification (mol %) | | | | | | |
| | PVA | R¹ | R² | | | | 1 sec | 3 sec | 5 sec | 10 sec | | |
|---|---|---|---|---|---|---|---|---|---|---|---|---|
| Example 49 | PVA 1 | $C_{18}H_{37}$ | $CH_3$ | 1,700 | 0.4 | 98.5 | 15 | 70 | 280 | 500 | A | A |
| Example 50 | PVA 2 | $C_{18}H_{37}$ | $CH_3$ | 2,400 | 0.4 | 98.5 | 12 | 70 | 250 | 450 | A | A |
| Example 51 | PVA 3 | $C_{18}H_{37}$ | $CH_3$ | 3,000 | 0.4 | 98.5 | 5 | 30 | 150 | 300 | A | A |
| Example 52 | PVA 4 | $C_{18}H_{37}$ | $CH_3$ | 500 | 0.4 | 98.5 | 10 | 60 | 250 | 450 | A | A |
| Example 53 | PVA 5 | $C_{18}H_{37}$ | $CH_3$ | 1,700 | 0.4 | 88 | 10 | 60 | 230 | 430 | A | B |
| Example 54 | PVA 6 | $C_{18}H_{37}$ | $CH_3$ | 1,700 | 0.4 | 80 | 5 | 20 | 150 | 320 | A | B |
| Example 55 | PVA 7 | $C_{18}H_{37}$ | $CH_3$ | 1,000 | 0.4 | 60 | 0 | 20 | 80 | 180 | A | C |
| Example 56 | PVA 8 | $C_{18}H_{37}$ | $CH_3$ | 1,700 | 0.08 | 88 | 5 | 20 | 100 | 200 | A | B |
| Example 57 | PVA 9 | $C_{12}H_{25}$ | $CH_3$ | 1,700 | 1.2 | 88 | 10 | 50 | 200 | 400 | A | B |
| Example 58 | PVA 10 | $C_{12}H_{25}$ | $CH_3$ | 1,700 | 0.4 | 98.5 | 10 | 30 | 210 | 350 | A | A |
| Example 59 | PVA 11 | $C_8H_{17}$ | $CH_3$ | 1,700 | 2.5 | 88 | 10 | 60 | 200 | 390 | A | B |
| Example 60 | PVA 12 | $C_{10}H_{21}$ | $CH_3$ | 1,700 | 0.4 | 98.5 | 10 | 60 | 270 | 340 | A | A |
| Example 61 | PVA 13 | $C_{26}H_{53}$ | $CH_3$ | 1,700 | 0.4 | 98.5 | 12 | 70 | 270 | 490 | A | A |
| Example 62 | PVA 14 | $C_{18}H_{37}$ | H | 1,700 | 0.4 | 88 | 10 | 70 | 250 | 360 | A | B |
| Example 63 | PVA 15 | $C_{18}H_{37}$ | $CH_3$ | 1,700 | 0.25 | 88 | 10 | 60 | 250 | 400 | A | B |
| Example 64 [1] | PVA 16 | $C_{18}H_{37}$ | $CH_3$ | 1,700 | 0.4/2.0 [2] | 98.5 | 15 | 60 | 270 | 480 | A | C |
| Comparative Example 25 | PVA i | $C_{18}H_{37}$ | $CH_3$ | 100 | 0.4 | 98.5 | 0 | 10 | 60 | 100 | B | C |
| Comparative Example 26 | PVA ii | $C_{18}H_{37}$ | $CH_3$ | 500 | 0.4 | 10 | — | — | — | — | — | — |
| Comparative Example 27 | PVA iii | $C_8H_{17}$ | $CH_3$ | 1,700 | 5.5 | 88 | — | — | — | — | — | — |
| Comparative Example 28 | PVA iv | $C_5H_{11}$ | $CH_3$ | 1,700 | 0.4 | 98.5 | 0 | 10 | 80 | 170 | A | B |
| Comparative Example 29 | PVA v | $C_{30}H_{61}$ | $CH_3$ | 1,700 | 0.4 | 98.5 | — | — | — | — | — | — |
| Comparative Example 30 | PVA vi | octadecyl vinyl ether | | 1,700 | 0.8 | 88 | — | — | — | — | — | — |
| Comparative Example 31 | PVA vii | lauryl vinyl ether | | 1,700 | 1 | 88 | — | — | — | — | — | — |
| Comparative Example 32 | PVA viii | — | | 3,000 | — | 98.5 | 7 | 30 | 130 | 280 | C | A |

[1] polymerization carried out using vinyl acetate, N-octadecylmethacrylamide and itaconic acid.
[2] percentage of alkyl modification/percentage of itaconic acid modification It is to be noted that "-" in Table 4 denotes that PVA was not completely dissolved, indicating unfavorability as an adhesive.

Example 65

An adhesive was prepared by adding 8 parts of a clay (Huber-900: kaolinite clay; mean particle diameter: 0.6 µm, manufactured by Huber Co.) as a filler to 100 parts of the 4% aqueous solution of PVA 1 obtained in Example 49, and stirring the mixture to allow the clay to be sufficiently dispersed. The solid content of the adhesive was 12.0%, and the mass ratio of the solid content of PVA 1 to that of the clay was 100:200. Using the resulting adhesive, evaluations were made on the initial adhesiveness, storage stability and water resistant adhesiveness in accordance with the method described above. The results are shown in Table 5.

Example 73

An adhesive was prepared by adding a clay similarly to Example 65 except that the aqueous solution of PVA 16 obtained in Example 64 was used in place of the aqueous solution of PVA 1. The solid content of the adhesive was 12.0%, and the mass ratio of the solid content of PVA 16 to that of the clay was 100:200. Using the resulting adhesive, evaluations were made on the initial adhesiveness, storage stability and water resistant adhesiveness in accordance with the method described above. The results are shown in Table 5.

Comparative Example 33

An adhesive was prepared by adding a clay similarly to Example 65 except that the aqueous solution of PVA viii obtained in Comparative Example 32 was used in place of the aqueous solution of PVA 1. The solid content of the adhesive was 12.0%, and the mass ratio of the solid content of PVA viii to that of the clay was 100:200. Using the resulting adhesive, evaluations were made on the initial adhesiveness, storage stability and water resistant adhesiveness in accordance with the method described above. The results are shown in Table 5.

Example 66

Into a glass polymerization vessel equipped with a reflux condenser, a dripping funnel, a thermometer, a nitrogen inlet port and a blade having a shape like a ship anchor weight were charged 450 parts of ion exchanged water and 32 parts of PVA-117 (Manufactured by Kuraray Co., Ltd.), and dissolution was permitted at 95° C. Next, after the aqueous PVA-117 solution was cooled and subjected to replacement with nitrogen gas, 40 parts of vinyl acetate were charged while stirring at 140 rpm. The temperature was elevated to 60° C., and then polymerization was started in the presence of a redox initiator system involving hydrogen peroxide/tartaric acid. After 15 min from the time point when the polymerization was started, 360 parts of vinyl acetate were continuously added over 3 hours. Thus, the polymerization was completed to obtain an emulsion of a vinyl acetate polymer (PVAc). The initiator used included 30 g of a 1% hydrogen peroxide solution and 10 g of a 5% aqueous tartaric acid solution. The resulting PVAc emulsion had a solid content concentration of 46.8%. An adhesive was prepared by mixing 100 parts of the 4% aqueous solution of PVA 1 obtained in Example 49 and 34.1 parts of the PVAc emulsion (mass ratio of the solid contents of PVA 1 to PVAc being 100:400). Using the resulting adhesive, evaluations were made on the initial adhesiveness, storage stability and water resistant adhesiveness in accordance with the method described above. The results are shown in Table 5.

Example 74

An adhesive was prepared in a similar manner to Example 66 except that the aqueous solution of PVA 16 obtained in Example 64 was used in place of the aqueous solution of PVA 1 (mass ratio of the solid contents of PVA 16 to PVAc being 100:400). Using the resulting adhesive, evaluations were made on the initial adhesiveness, storage stability and water resistant adhesiveness in accordance with the method described above. The results are shown in Table 5.

Comparative Example 34

An adhesive was prepared in a similar manner to Example 66 except that the aqueous solution of PVA viii obtained in Comparative Example 32 was used in place of the aqueous solution of PVA 1 (mass ratio of the solid contents of PVA viii to PVAc being 100:400). Using the resulting adhesive, evaluations were made on the initial adhesiveness, storage stability and water resistant adhesiveness in accordance with the method described above. The results are shown in Table 5.

Example 67

A clay (Huber-900: kaolinite clay; mean particle diameter: 0.6 µm, manufactured by Huber Co.) in an amount of 8 parts was added to 100 parts of the aqueous solution of PVA 1 obtained in Example 49, and the mixture was stirred to allow the clay to be sufficiently dispersed. To the dispersion liquid were added 34.1 parts of the PVAc emulsion obtained in Example 66, and mixed to prepare an adhesive (mass ratio of the solid contents of PVA 1, PVAc and the clay being 100:400:200). Using the resulting adhesive, evaluations were made on the initial adhesiveness, storage stability and water resistant adhesiveness in accordance with the method described above. The results are shown in Table 5.

Example 75

An adhesive was prepared in a similar manner to Example 67 except that the aqueous solution of PVA 16 obtained in Example 64 was used in place of the aqueous solution of PVA 1 (mass ratio of the solid contents of PVA 1, PVAc and the clay being 100:400:200). Using the resulting adhesive, evaluations were made on the initial adhesiveness, storage stability and water resistant adhesiveness in accordance with the method described above. The results are shown in Table 5.

Comparative Example 35

An adhesive was prepared in a similar manner to Example 67 except that the aqueous solution of PVA viii obtained in Comparative Example 32 was used in place of the aqueous solution of PVA 1 (mass ratio of the solid contents of PVA viii, PVAc and the clay being 100:400:200). Using the resulting adhesive, evaluations were made on the initial adhesiveness, storage stability and water resistant adhesiveness in accordance with the method described above. The results are shown in Table 5.

Examples 68 and 69

Each adhesives was obtained in a similar manner to Example 67 except that calcium carbonate (Whiton P-30, heavy calcium carbonate; mean particle diameter: 1.75 μm, manufactured by Shiraishi Kogyo Co., Ltd.) or an oxidized starch (MS-3800, manufactured by NIHON SHOKUHIN KAKO CO., LTD.) was used in place of the clay. Using the resulting adhesive, evaluations were made on the initial adhesiveness, storage stability and water resistant adhesiveness in accordance with the method described above. The results are shown in Table 5.

Example 70

Into a glass polymerization vessel equipped with a reflux condenser, a dripping funnel, a thermometer and a nitrogen inlet port were charged 500 parts of ion exchanged water and 28 parts of polyvinyl alcohol having a mercapto group at an end (M-205: degree of polymerization: 550; degree of saponification: 88.2 mol %, manufactured by Kuraray Co., Ltd.), dissolution was permitted at 95° C. Next, 20 g of methyl methacrylate and 20 g of n-butyl acrylate were added thereto, followed by replacement with nitrogen gas. Then the temperature was elevated to 65° C., and 12 g of a 1% aqueous potassium persulfate solution was added thereto to start the polymerization. Furthermore, 180 g of methyl methacrylate and 180 g of n-butyl acrylate were continuously added over 2 hours. The polymerization was completed in 4 hours to obtain a methyl methacrylate/n-butyl acrylate copolymer (ACR) emulsion having a solid content concentration of 45.1% and a viscosity of 2,800 mPa·s. A clay (Huber-900: kaolinite clay; mean particle diameter: 0.6 μm, manufactured by Huber Co.) in an amount of 8 parts was added to 100 parts of the aqueous solution of PVA 1 obtained in Example 49, and the mixture was stirred to allow the clay to be sufficiently dispersed. Thereto were added 35.4 parts of the ACR emulsion, and mixed to prepare an adhesive (mass ratio of the solid contents of PVA 1, ACR and the clay being 100:400:200). Using the resulting adhesive, evaluations were made on the initial adhesiveness, storage stability and water resistant adhesiveness in accordance with the method described above. The results are shown in Table 5.

Example 71

An adhesive was prepared in a similar manner to Example 70 except that 29.0 parts of an ethylene-vinyl acetate copolymer (VAE) emulsion (OM-4200NT; solid content concentration: 55.0%, Manufactured by Kuraray Co., Ltd.) were used in place of the methyl methacrylate/n-butyl acrylate copolymer (ACR) emulsion (mass ratio of the solid contents of PVA 1, VAE and the clay being 100:400:200). Using the resulting adhesive, evaluations were made on the initial adhesiveness, storage stability and water resistant adhesiveness in accordance with the method described above. The results are shown in Table 5.

Example 72

An adhesive was prepared in a similar manner to Example 70 except that 33.3 parts of a styrene-butadiene copolymer (SBR) emulsion (NALSTAR SR-107; solid content concentration: 48.0%, manufactured by Nippon A&L Inc.) were used in place of the methyl methacrylate/n-butyl acrylate copolymer (ACR) emulsion (mass ratio of the solid contents of PVA 1, SBR and the clay being 100:400:200). Using the resulting adhesive, evaluations were made on the initial adhesiveness, storage stability and water resistant adhesiveness in accordance with the method described above. The results are shown in Table 5.

TABLE 5

| | Adhesive | | | | | Initial adhesive strength (g/cm) | | | | | Water |
| | | emulsion | | filler | | pressure bonding time | | | | Storage | resistant |
| | PVA | type | part | type | part | 1 sec | 3 sec | 5 sec | 10 sec | stability | adhesiveness |
|---|---|---|---|---|---|---|---|---|---|---|---|
| Example 65 | PVA 1 | absent | — | clay | 200 | 20 | 120 | 370 | 550 | A | A |
| Example 66 | PVA 1 | PVAc | 400 | absent | — | 15 | 110 | 360 | 530 | A | A |
| Example 67 | PVA 1 | PVAc | 400 | clay | 200 | 25 | 140 | 400 | 600 | A | A |
| Example 68 | PVA 1 | PVAc | 400 | calcium carbonate | 200 | 25 | 130 | 390 | 590 | A | A |
| Example 69 | PVA 1 | PVAc | 400 | oxidized starch | 200 | 25 | 120 | 380 | 580 | A | A |
| Example 70 | PVA 1 | ACR | 400 | clay | 200 | 20 | 100 | 360 | 590 | A | A |
| Example 71 | PVA 1 | VAE | 400 | clay | 200 | 25 | 140 | 400 | 610 | A | A |
| Example 72 | PVA 1 | SBR | 400 | clay | 200 | 20 | 110 | 350 | 580 | A | A |
| Example 73 | PVA 16 | absent | — | clay | 200 | 15 | 110 | 360 | 540 | A | C |
| Example 74 | PVA 16 | PVAc | 400 | absent | — | 10 | 100 | 350 | 520 | A | C |
| Example 75 | PVA 16 | PVAc | 400 | clay | 200 | 20 | 130 | 390 | 580 | A | C |
| Comparative Example 33 | PVA viii | absent | — | clay | 200 | 15 | 100 | 320 | 500 | C | B |
| Comparative Example 34 | PVA viii | PVAc | 400 | absent | — | 15 | 90 | 250 | 340 | B | B |
| Comparative Example 35 | PVA viii | PVAc | 400 | clay | 200 | 15 | 120 | 350 | 420 | B | B |

As is seen from the results shown in Table 4 and Table 5, the adhesive of the present invention was superior in the initial adhesiveness and storage stability. Furthermore, it is proven that superior water resistant adhesiveness can be also achieved by adjusting the degree of saponification of the alkyl-modified PVA employed, the content of the monomer unit (a) represented by the above general formula (I) (i.e., percentage of alkyl modification), the content of a monomer unit (b) having a carboxyl group (i.e., percentage of itaconic acid modification), and the like.

Examples 76 to 90 and Comparative Examples 36 to 43

Film

In a similar manner to the test on water solubility of PVA described above, an aqueous PVA solution having a concentration of 4% was each prepared using each PVA shown in Table 6. Each aqueous PVA solution was flow casted on a PET film, followed by drying under a condition involving a temperature of 20° C. and a relative humidity of 65% for one week to obtain each PVA film of Examples 76 to 90 and Comparative Examples 36 to 43. Each PVA film had a thickness of 100 μm. Each of the resulting films was evaluated in accordance with the following methods. The results of evaluation are shown in Table 6.

[Tactile Sensation of Film]

Tactile sensation of the resulting PVA film was compared with a film which had been similarly produced using "PVA-117" manufactured by Kuraray Co., Ltd., and the evaluation was made based on the following criteria:
A: being flexible similarly to PVA-117;
B: being somewhat harder than PVA-117 and fragile; and
C: being markedly harder than PVA-117 and fragile.

[Measurement of Film Contact Angle]

A contact angle of the resulting PVA film was measured using a solid-liquid interface analysis instrument, Drop Master 500 manufactured by Kyowa Interface Science Co., LTD., and the evaluation was made based on the following criteria:
A: no less than 90°;
B: no less than 85° and less than 90°;
C: no less than 80° and less than 85°;
D: no less than 70° and less than 80°; and
E: less than 70°.

TABLE 6

|  |  | Unsaturated monomer | | Results of polymerization | | | Results of film evaluation | |
|---|---|---|---|---|---|---|---|---|
|  | PVA | $R^1$ | $R^2$ | degree of polymerization | percentage of modification (mol %) | degree of saponification (mol %) | tactile sensation | contact angle |
| Example 76 | PVA 1 | $C_{18}H_{37}$ | $CH_3$ | 1,700 | 0.4 | 98.5 | A | A |
| Example 77 | PVA 2 | $C_{18}H_{37}$ | $CH_3$ | 2,400 | 0.4 | 98.5 | A | A |
| Example 78 | PVA 3 | $C_{18}H_{37}$ | $CH_3$ | 3,000 | 0.4 | 98.5 | A | A |
| Example 79 | PVA 4 | $C_{18}H_{37}$ | $CH_3$ | 500 | 0.4 | 98.5 | B | A |
| Example 80 | PVA 5 | $C_{18}H_{37}$ | $CH_3$ | 1,700 | 0.4 | 88 | A | B |
| Example 81 | PVA 6 | $C_{18}H_{37}$ | $CH_3$ | 1,700 | 0.4 | 80 | A | B |
| Example 82 | PVA 7 | $C_{18}H_{37}$ | $CH_3$ | 1,000 | 0.4 | 60 | B | B |
| Example 83 | PVA 8 | $C_{18}H_{37}$ | $CH_3$ | 1,700 | 0.08 | 88 | A | C |
| Example 84 | PVA 9 | $C_{12}H_{25}$ | $CH_3$ | 1,700 | 1.2 | 88 | B | B |
| Example 85 | PVA 10 | $C_{12}H_{25}$ | $CH_3$ | 1,700 | 0.4 | 98.5 | A | B |
| Example 86 | PVA 11 | $C_8H_{17}$ | $CH_3$ | 1,700 | 2.5 | 88 | B | C |
| Example 87 | PVA 12 | $C_{10}H_{21}$ | $CH_3$ | 1,700 | 0.4 | 98.5 | A | B |
| Example 88 | PVA 13 | $C_{26}H_{53}$ | $CH_3$ | 1,700 | 0.4 | 98.5 | A | A |
| Example 89 | PVA 14 | $C_{18}H_{37}$ | H | 1,700 | 0.4 | 88 | A | B |
| Example 90 [1] | PVA 16 | $C_{18}H_{37}$ | $CH_3$ | 1,700 | 0.4/2.0 [2] | 98.5 | A | E |
| Comparative Example 36 | PVA i | $C_{18}H_{37}$ | $CH_3$ | 100 | 0.4 | 98.5 | C | D |
| Comparative Example 37 | PVA ii | $C_{18}H_{37}$ | $CH_3$ | 500 | 0.4 | 10 | — | — |
| Comparative Example 38 | PVA iii | $C_8H_{17}$ | $CH_3$ | 1,700 | 5.5 | 88 | — | — |
| Comparative Examols 39 | PVA iv | $C_5H_{11}$ | $CH_3$ | 1,700 | 0.4 | 98.5 | A | E |
| Comparative Example 40 | PVA v | $C_{30}H_{61}$ | $CH_3$ | 1,700 | 0.4 | 98.5 | — | — |
| Comparative Example 41 | PVA vi | octadecyl vinyl ether | | 1,700 | 0.8 | 88 | — | — |
| Comparative Example 42 | PVA vii | lauryl vinyl ether | | 1,700 | 1 | 88 | — | — |
| Comparative Examcle 43 | PVA viii | — | | 3,000 | — | 98.5 | A | E |

[1] polymerization carried out using vinyl acetate, N-octadecylmethacrylamide and itaconic acid.
[2] percentage of alkyl modification/percentage of itaconic acid modification It is to be noted that "-" in Table 6 denotes that PVA was not completely dissolved, indicating unfavorability as a material of films.

The film produced using the alkyl-modified PVA of the present invention had a higher contact angle relative to water, as compared with the unmodified PVA (Example 78 and Comparative Example 43). Also, the alkyl-modified PVA of the present invention had higher water solubility as compared with the alkyl vinyl ether-modified PVA having a similar length of the alkyl chain, and excellent handleability as an aqueous solution was provided (Example 80 and Comparative Example 41). However, in the case in which the degree of polymerization is low, the state of the film was inferior (Comparative Example 36), whereas when the number of carbon atoms of the alkyl chain is greater than 29, a large quantity of undissolved matter was found in the aqueous solution (Comparative Example 40). In addition, although the alkyl-modified PVA to which 2.0 mol % itaconic acid unit was introduced was superior in water solubility, a low contact angle was exhibited (Example 90).

INDUSTRIAL APPLICABILITY

As explained in the foregoing, the alkyl-modified PVA of the present invention can exert superior thickening property while maintaining high water solubility, and can have superior water resistance in a state being hardened. Therefore, the alkyl-modified PVA can be suitably used for thickeners, coating materials for papers, adhesives, film, and the like.

The composition of the present invention can be suitably used as, for example, a coating material for papers (clear coating agent, pigment coating agent, internal sizing agent, binder for over coating of thermal papers, etc.), a binder, an adhesive, a fiber sizing agent, and the like. The thickener of the present invention can be suitably used as a thickener for use in water-based solutions and water-based emulsion solutions such as paints, cements, concretes, binders, adhesives and cosmetics. The coating material for papers of the present invention can be suitably used for the production of coated papers such as, for example, thermal papers, ink jet recording papers, base papers of a release paper, and the like. The adhesive of the present invention can be suitably used as an adhesive for papers used in the production or use of corrugated cardboards, paper bags, paper boxes, paper tubes, wall papers and the like, as well as an adhesive for woodworking used of adhering wood building materials with one another, a wood building material with fibers, a wood building material with a paper, and a wood building material with a plastic. Also, the adhesive of the present invention can be also used for intended usage in which a target material of adhesion is fibers such as a fabric or a nonwoven fabric, a cement molding matter such as a concrete, any of various types of plastics, an aluminum foil or the like. Moreover, the film of the present invention can be suitably used as any of various types of water-repellent coating materials, a surface covering material, and the like.

The invention claimed is:

1. An alkyl-modified vinyl alcohol polymer, comprising no less than 0.05 mol % and no greater than 5 mol % of a monomer unit (a) represented by formula (I):

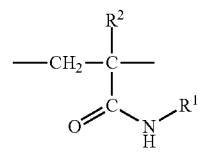

wherein:
$R^1$ represents a linear or branched alkyl group having 8 to 29 carbon atoms;
$R^2$ represents a hydrogen atom or an alkyl group having 1 to 8 carbon atoms,
the alkyl-modified vinyl alcohol polymer has a viscosity average degree of polymerization of no less than 200 and no greater than 5,000; and
the alkyl-modified vinyl alcohol polymer has a degree of saponification of no less than 20 mol % and no greater than 99.99 mol %.

2. The polymer according to claim 1, wherein $R^1$ is a linear or branched alkyl group having 15 to 26 carbon atoms.

3. The polymer according to claim 1, wherein the degree of saponification is no less than 60 mol % and no greater than 99.9 mol %.

4. The polymer according to claim 1, which is obtained by saponification of a copolymer comprising an unsaturated monomer represented by formula (II):

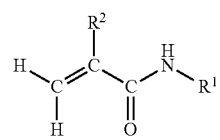

and a vinyl ester monomer.

5. The polymer according to claim 1, further comprising less than 0.1 mol % of a monomer unit (b) comprising a carboxyl group.

6. A composition, comprising the alkyl-modified vinyl alcohol polymer according to claim 1.

7. The composition according to claim 6, further comprising water and an oil component, such that a content of the alkyl-modified vinyl alcohol polymer with respect to 100 parts by mass of the oil component is no less than 0.1 parts by mass and no greater than 50 parts by mass.

8. A thickener, comprising the alkyl-modified vinyl alcohol polymer according to claim 1.

9. The thickener according to claim 8, further comprising water or a water-containing solvent.

10. A coating material, comprising the alkyl-modified vinyl alcohol polymer according to claim 1.

11. A coated paper provided with the coating material according to claim 10 coated on a surface of a paper.

12. An adhesive, comprising the alkyl-modified vinyl alcohol polymer according to claim 1.

13. The adhesive according to claim 12, further comprising a polymer in a state of an emulsion, said polymer obtained from at least one monomer selected from the group consisting of an ethylene unsaturated monomer and a diene monomer.

14. The adhesive according to claim 12, further comprising a filler.

15. The adhesive according to claim 12, which is suitable for papers or for woodworking.

16. A film, comprising the alkyl-modified vinyl alcohol polymer according to claim 1.

17. The film according to claim 16 having a contact angle relative to water of no less than 70°.

* * * * *